United States Patent
Windhab et al.

(10) Patent No.: US 11,452,302 B2
(45) Date of Patent: Sep. 27, 2022

(54) SPHERICAL PARTICLE, AND FOOD SUSPENSIONS AND CONSUMABLE MASSES HAVING SPHERICAL PARTICLES

(71) Applicant: Bühler AG, Uzwil (CH)

(72) Inventors: Erich Josef Windhab, Hemishofen (CH); Patrick Strähl, Zürich (CH); William Hanselmann, Triesen (LI)

(73) Assignee: Buehler AG, Uzwil (CH)

( * ) Notice: Subject to any disclaimer, the term of this patent is extended or adjusted under 35 U.S.C. 154(b) by 744 days.

(21) Appl. No.: 15/026,323

(22) PCT Filed: Oct. 1, 2014

(86) PCT No.: PCT/EP2014/071050
§ 371 (c)(1),
(2) Date: Mar. 31, 2016

(87) PCT Pub. No.: WO2015/049292
PCT Pub. Date: Apr. 9, 2015

(65) Prior Publication Data
US 2016/0242432 A1    Aug. 25, 2016

(30) Foreign Application Priority Data

Oct. 1, 2013  (EP) .................................. 13186911

(51) Int. Cl.
*A23G 1/40* (2006.01)
*A23G 1/00* (2006.01)
(Continued)

(52) U.S. Cl.
CPC ............ *A23G 1/40* (2013.01); *A23G 1/0006* (2013.01); *A23G 1/0016* (2013.01); *A23G 1/46* (2013.01);
(Continued)

(58) Field of Classification Search
CPC .......... A23G 1/40; A23G 1/46; A23G 1/0006; A23G 1/0016; A23L 33/10; A23L 33/20; A23P 10/22; A23P 10/40
See application file for complete search history.

(56) References Cited

U.S. PATENT DOCUMENTS 3,472,658 A    10/1969  Isaacs
4,594,259 A *   6/1986  Baker ...................... A23D 9/00
                                                    426/613
(Continued)

FOREIGN PATENT DOCUMENTS

CH    502 834       2/1971
DE    3621110 A1    1/1987
(Continued)

OTHER PUBLICATIONS

Nordic Sugar. "The function properties of sugar", Member of Nordzucker Group, Oct. 21, 2012, pp. 1-23 [Retrieved on Jul. 23, 2018], Retrieved from the Internet: URL <http://www.nordicsugar.com/fileadmin/Nordic_Sugar/Brochures_factsheet_policies_news/>. (Year: 2012).*

(Continued)

*Primary Examiner* — Stephanie A Cox
(74) *Attorney, Agent, or Firm* — Finch & Maloney PLLC; Jay S. Franklin; Michael J. Bujold

(57) ABSTRACT

Spherical particles, agglomerates of spherical particles, methods of producing spherical particles, food suspensions and consumable masses which have spherical particles, and food products which contain a food suspension and/or a consumable mass are disclosed. The particles contain a matrix material composed of an amorphously solidified biopolymer, preferably having a dextrose equivalent greater than 20 and having an equilibrium water content preferably less than 10 wt %. The solid particles and/or liquid and/or gas volumes are embedded in the matrix material. The food (Continued)

Figure 1A:
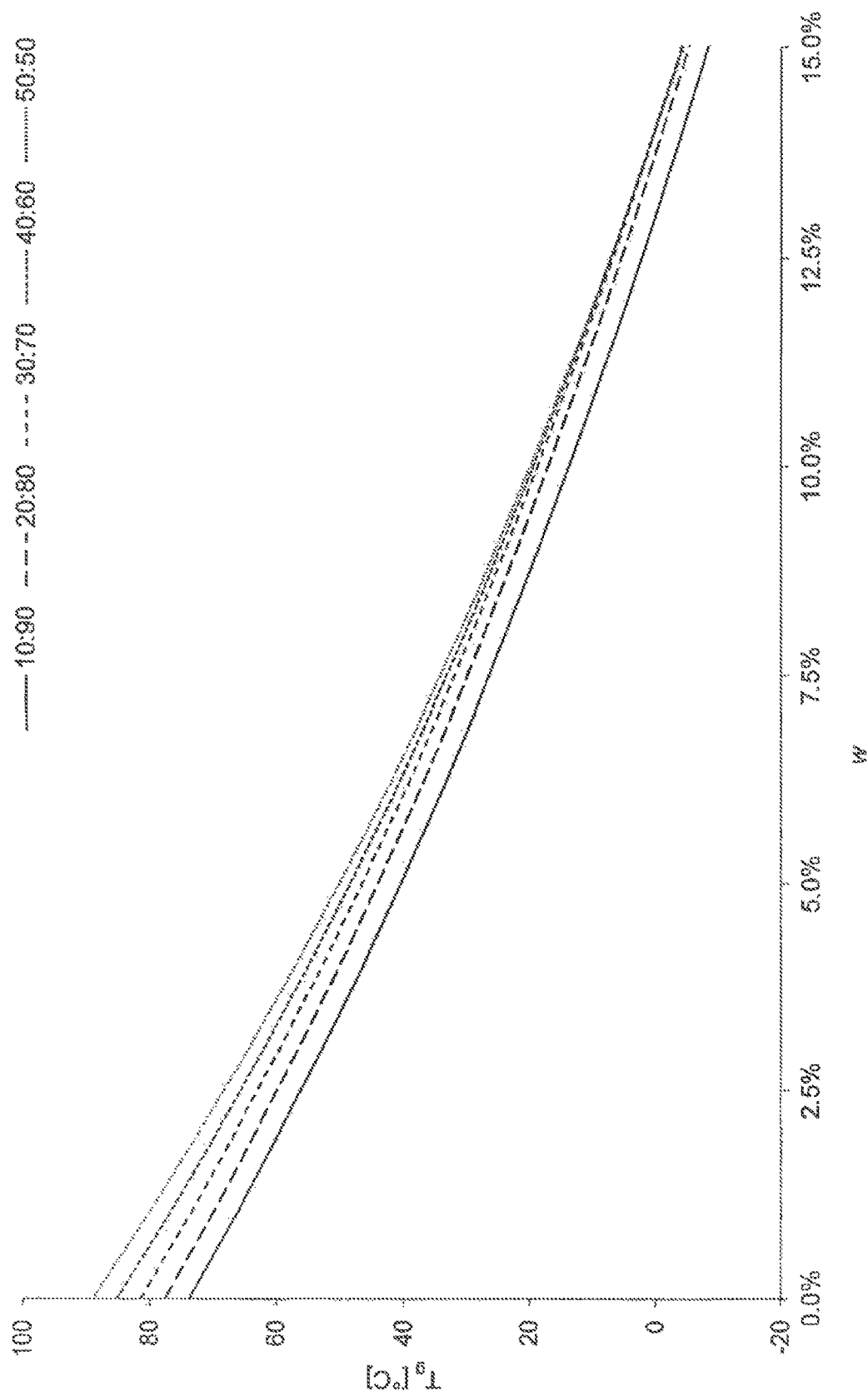

suspension contains a substantially homogeneous carrier material in which spherical particles are embedded. A consumable mass comprises an agglomerate of particles where some of the particles are spherical particles. Use of embedded cocoa particles reduces the roughness of the cocoa particles and a flow point white eliminating the need for emulsifiers. This allows up to a 50% reduction of the fat phase and production of a low-calorie chocolate product.

33 Claims, 11 Drawing Sheets

(51) Int. Cl.
*A23L 33/10* (2016.01)
*A23P 10/40* (2016.01)
*A23P 10/22* (2016.01)
*A23L 33/20* (2016.01)
*A23G 1/46* (2006.01)

(52) U.S. Cl.
CPC ............... *A23L 33/10* (2016.08); *A23L 33/20* (2016.08); *A23P 10/22* (2016.08); *A23P 10/40* (2016.08); *A23V 2002/00* (2013.01)

(56) References Cited

U.S. PATENT DOCUMENTS

| | | | |
|---|---|---|---|
| 5,123,162 A | 6/1992 | Wing et al. | |
| 5,124,162 A | 6/1992 | Boskovic et al. | |
| 5,637,344 A | 6/1997 | Carpenter et al. | |
| 5,683,720 A | 11/1997 | Myers et al. | |
| 2006/0286727 A1* | 12/2006 | Kim | G02F 1/136213 438/155 |
| 2013/0251883 A1 | 9/2013 | Ohsumi | |

FOREIGN PATENT DOCUMENTS

| | | | | |
|---|---|---|---|---|
| DE | 10 2004 024 681 A1 | 12/2005 | | |
| EP | 0922449 A2 | 6/1999 | | |
| EP | 1 064 856 A2 | 1/2001 | | |
| EP | 1 304 044 A2 | 4/2003 | | |
| EP | 1603539 A1 * | 12/2005 | ........... | A61K 9/1623 |
| GB | 2177283 A | 1/1987 | | |
| JP | S62253341 A | 11/1987 | | |
| JP | H02163039 A | 6/1990 | | |
| JP | 11-103780 | 4/1999 | | |
| WO | 99/07901 A1 | 2/1999 | | |
| WO | 2006/005525 A1 | 1/2006 | | |
| WO | 2006/130698 A2 | 12/2006 | | |

OTHER PUBLICATIONS

Busin L. et al., "Notion of Glass Transition Applied to the Spray-Drying of Carbohydrate Solutions", Sciences Des Aliments, BD. 16, NR 5, 1996, pp. 443-459.
Jouppila K. et al., "Glass Transition, Water Plasticization, and Lactose Crystallization in Skim Milk Powder", Journal of Dairy Science, American Dairy Science Association, BD. 80, NR.Dec. 12, 1997, pp. 3152-3160.
Yrjo Roos et al. "Phase Transitions of Mixtures of Amorphous Polysaccharides and Sugars", Biotechnology Progress, BD. 7, NR. 1, 1991, pp. 49-53.
"Zucker Und Zuckerwaren", Hoffmann/Mauch/Untze, 2nd ed. 2002, pp. 234-235 (to follow).
International Search Report for corresponding PCT application No. PCT/EP2014/071050 dated Mar. 31, 2015.
Written Opinon for corresponding PCT application No. PCT/EP2014/071050 dated Mar. 31, 2015.
Kyoritsu Shuppan K.K./Masao Nanjo, Food Science Handbook, First edition, First press, May 10, 1978, pp. 262 and 263.
Japanese Office Action issued in corresponding Japanese Patent Application No. 2016-519840 dated Apr. 10, 2017.
http://caobisco.eu/caobisco-choco-late-biscuits-confectionery-europe-page-44-Analytical-methods-lilml, Analytical Method 46 (2000), Viscosity of Cocoa and Chocolate Products, 19 Pages [See Specification, p. 59].
http://www.appliedrheology.org, J. Eischen and E. Windhab, Viscosity of Cocoa and Chocolate Products, Applied Rheology, Jan./Feb. 2002, pp. 32-34, Zürich, Switzerland [See Specification, p. 59].
Carlos A. Aguilar et al., "Viscosity of Molten Milk Chocolate with Lactose from Spray-Dried Whole-Milk Powders", Journal of Food Science, vol. 60, No. 1, 1995, pp. 120-124.
European Office Action issued in corresponding European Patent Application No. 18 152 465.3 dated Nov. 15, 2019.
European Search Report issued in corresponding European Patent Application No. 18152465.3 dated Mar. 13, 2018.
Chinese Office Action Corresponding to 201480054051.0 dated Jul. 3, 2020.

\* cited by examiner

SPHERICAL PARTICLE, AND FOOD SUSPENSIONS AND CONSUMABLE MASSES HAVING SPHERICAL PARTICLES

This application is a National Stage completion of PCT/EP2014/071050 filed Oct. 1, 2014, which claims priority from European patent application No. 13186911.7 filed Oct. 1, 2013.

FIELD OF THE INVENTION

The invention relates to spherical particles, to agglomerates of spherical particles, to methods for producing spherical particles, to food suspensions and consumable masses having spherical particles and to food products comprising a food suspension and/or a consumable mass.

BACKGROUND OF THE INVENTION

For producing conventional chocolate products particles, typically comprising crystalline sugar, cocoa constituents and/or dried milk constituents, are suspended in liquid cocoa butter. This is precrystallized in a temperature conditioning operation, with cooling, and lastly finally solidified, in particular crystallized, with cooling.

Chocolate products should nave a high sensorial quality. Sensorial quality here is understood as meaning the quality of the taste and texture of a consumable product, also called food product, which is perceived on its consumption and which determines the enjoyment value. A high enjoyment value is as a rule established for chocolate products if in the solidified state the chocolate mass has a crisp and at the same time soft, that is to say on melting a low-viscosity creamy consistency, melts rapidly and feels smooth, that is to say not perceptibly rough, in the mouth.

The sensorial quality can be evaluated by means of so-called "quantitative descriptive analysis (QDA)", for which test persons are used.

The sensorial quality is determined by the raw materials, for example the cocoa bean variety, and in particular by the processing steps during the chocolate production.

In the production of a conventional chocolate product the chocolate mass must be comminuted between rollers and/or conched to achieve a high sensorial quality, wherein angular particles are formed as a result of the comminution. In this procedure the suspended particles are deagglomerated, finely divided and also changed physically and/or chemically with respect to some of their constituent components contributing towards flavor development. These operations (fine rolling, couching) are extremely time- and energy-consuming.

In the context of the present invention sugars are understood as meaning sweetening components, in particular saccharides, that is to say mono-, di- and oligosaccharides, in particular having a dextrose equivalent (DE) of greater than 20, sugar alcohols, sugar substitutes and sweeteners, and combinations of these. The DE is determined here by the Lane-Eynon method, which is described, for example, in "Zucker und Zuckerwaren" (see Hoffmann/Mauch/Untze, 2nd ed. 2002, ISBN 3-86022-937-0, p. 234-235).

WO 2006/130698 discloses that a cost and/or a calorie-reduced product can be obtained by replacing crystalline sugar by amorphous sugar, the latter as a rule having a lower density than crystalline sugar. Cocoa particles, milk particles and/or fruit purees furthermore can be embedded into the amorphous sugar. The amorphous sugar is prepared by dissolving sugar material in water, heating the solution, removing the water, drying the material and then grinding it. The particles formed in this way have typical broken edges, as a result of which the mass with the suspended particles must still, be after-treated in order to achieve an adequate sensorial quality.

WO 2006/005525 discloses a sintered consumable product in which milk- or sugar-based spray-dried powders are combined to give a porous product. A product having a low fat content and/or a high carbohydrate content can be obtained in this manner. The sensorial quality cannot be improved by rolling or couching. The resulting product has only limited flowability.

CH 502 834 discloses a method in which spherical grains are produced from crystalline sugar by means of so-called spray crystallization, wherein cocoa powder, which for example contains fat, is admixed to the spheres. The grains produced are readily flowable and can be dissolved rapidly in water, so that they can be used for the preparation of a sweetened instant cocoa drink. However, these grains are not suitable for the production of chocolate products.

The publication EP 1064 856 relates to the encapsulation of so-called active ingredients. The active ingredients, for example flavoring substances, are added into a sugar solution, and this is solidified by spray drying. The semi-solid, spherical particles formed having a water content of between 10% and 20% are dried, during which they agglomerate to larger particles having diameters of approx. 400 µm.

The publication U.S. Pat. No. 5,123,162 discloses flavoring substances in a hydrocarbon substrate which have been fixed by spray drying.

Flavoring substances or fruit particles are embedded in an amorphous sugar substrate of mono- and disaccharides. So that the particles are stable, the matrix comprises a high molecular weight film-forming material, for example a gum or a chemically modified starch.

The publication EP 1 304 044 relates to material encapsulated by hydroxypropylcellulose. The publication discloses particles, wherein flavorings are embedded in an amorphous or partially crystalline matrix. Apart from hydroxypropylcellulose, the matrix comprises, for example, sugar.

The publication WO 99/07901 relates to mesomorphic sugar particles. Amorphous sugar spheres, into which additives, such as flavorings, foodstuffs or cocoa, are embedded, are produced in a centrifuge using a so-called "liquiflash" process. The spheres are after-crystallized and comminuted, so that microcrystallites having diameters of less than 10 µm are formed. Fondant compositions having these small particles impart the taste and the feeling in the mouth of a fat-rich mass.

The publication U.S. Pat. No. 5,637,344 relates to sugar articles having a chocolate taste. Cocoa powder particles which have been subjected to a so-called "air-jet milling" process in which rounded particles having diameters of less than 15 µm are formed, are embedded in an amorphous sugar mass. In contrast to conventionally ground cocoa powder, these small, rounded particles do not generate a rough, sand-like taste on the tongue.

The publication U.S. Pat. No. 3,472,658 relates to a readily wettable sugar composition. A sugar particle is surrounded by a cocoa layer, which in turn is coated with amorphous sugar. The particles can have a particle diameter approximately between 150 µm and 1 mm.

SUMMARY OF THE INVENTION

It is the object of the present invention to provide starting materials, food suspensions and/or consumable masses which overcome the disadvantages of those known and with which a significantly calorie-reduced food product which meets the high sensorial requirements with respect to consistency, texture, taste and stability can be produced, and corresponding methods for production which have a reduced energy requirement.

The object is achieved by a spherical particle for producing a food product, wherein the particle comprises a matrix material of amorphously solidified biopolymer, wherein, the matrix material has a water content which is selected such that in particular the glass transition temperature of the matrix material is above the typical or intended storage, consumption and/or processing temperature, in particular the glass transition temperature is greater than 25° C., and wherein the water content of the matrix material is less than 10% by weight, (equilibrium moisture content in the matrix material at 20° C. and 1,023 hPa).

In the present application a matrix material is understood as meaning a base substance in which other constituents, preferably individually and/or portioned and preferably substantially uniformly distributed, can be embedded.

The glass transition temperature means the glass transition temperature determined by means of the dynamic differential scanning calorimetry (DSC) described in detail later.

The biopolymer can be, for example, a starch, proteins, microcrystalline cellulose or a polyglycerol ester (PGE). In particular, the biopolymer is a sugar or a sugar/polysaccharide mixture, e.g. a mixture of sugars with starches, optionally partially degraded, starches, or the biopolymer comprises a sugar or a sugar/polysaccharide mixture.

Preferably, the matrix material comprises amorphously solidified sugar, further preferably sugar having a dextrose equivalent of greater than 20, or consists thereof.

The matrix material can comprise a mixture of sugars having different dextrose equivalents or consist thereof, wherein a dextrose equivalent of more than 20 can form in total.

In particular, the matrix material comprises no cellulose or derivatives thereof.

In particular, solid particles and/or volumes of liquid and/or volumes of gas are embedded into the matrix material. These particles having embedded substances are also called composite particles in the following.

The water content of the matrix material corresponds to the equilibrium water content of the spherical particle. This water content determines the thermomechanical properties of the particle and significantly influences the glass transition temperature thereof. The spherical particle can have constituents which are embedded into the matrix material and which comprise encapsulated water. This does not contribute towards the equilibrium water content of the particle, since it is enclosed and cannot diffuse into the matrix material.

The water content can be determined by titration or via the determination of the glass transition temperature, for example by dynamic mechanical analysis (DMA) or by dynamic differential scanning calorimetry (DSC).

In the present application bodies of which more than 70% of the surface is convexly curved, that is say less than 30% of the surface is formed from flat part areas, are called spherical particles.

The spherical particles have a sphericity of greater than 0.5, preferably greater than 0.8, further preferably greater than 0.9. Sphericity $\psi$ is understood as meaning the ratio of the surface of a sphere having the same volume as the given particle and the surface of the particle:

$$\psi = \frac{\pi^{\frac{1}{3}}(6V_p)^{\frac{2}{3}}}{A_p}$$

wherein $V_p$ designates the particle volume s and $A_p$ designates the particle surface. If the particle has the shape of a sphere, a sphericity of 1 results.

It has been found that spherical particles are particularly well-suited to ensuring a high sensorial quality in a food suspension or a consumable mass. Angular particles must be smaller and be present in a more homogeneous distribution in order to generate a comparably good sensorial quality with respect to the roughness sensed, the viscosity and/or consistency.

Spherical particles can be present in a consumable mass with larger diameters than broken or angular particles and lead to the same sensorial quality.

The amorphous state ensures that no crystal faces with edges are present on the surface of the particles.

The water content is fixed such that the amorphously solidified biopolymer does not after-crystallize under specifically selected storage conditions.

A sufficiently low equilibrium water content established according to the invention in the matrix material of, for example, less than 10% by weight ensures that after-crystallization and therefore the formation of angular surface structures does not occur under the typical and/or intended use, storage or consumption temperatures, since the glass transition temperature is established such that it is not exceeded in periods of time relevant for crystallization.

Such periods of time can be, for example, several hours, depending on the substance system and temperature difference between the actual temperature of the amorphous matrix and the glass transition temperature.

It has been found that in addition to a possible after-crystallization, the softening of the matrix material, in particular at the particle surface, is also decisive for the interaction of the particles with one another.

The tackiness of the surface is influenced by the water content, the water activity, the temperature at the surface of the particle and the glass transition temperature, as well as the chemical composition of the particle.

In rheological measurements for mixtures of particles which have an amorphous matrix material and triglycerides, it has been found that the viscosity initially decreases as a function of the temperature, and increases again when a certain critical temperature is exceeded. This critical temperature can be related to the glass transition temperature and is called the rheologically characterized glass transition temperature ($T_{g,rhe}$). This is approx. 10-20° C. higher than the glass transition temperature determined by means of DSC.

The temperature prevailing at the surface is decisive for the tackiness. Under isothermal equilibrium conditions the temperature of the surface is the same as the temperature of the particle core. Taking into account non-equilibrium states, however, the surface temperature may be higher than the core temperature of the particle as a result of friction, so that tackiness may occur on the surface, although the mean temperature of the particle has not yet reached the critical, temperature $T_{g,rhe}$.

In a preferred embodiment of the invention the after-crystallization, like the tackiness also, is counteracted by a sufficient content, preferably at least 10% by weight, of long-chain biopolymers, for example a dextrose/sucrose mixture having a dextrose equivalent DE of 19.

Here and in the following, a dextrose is understood as meaning a mixture of mono- and polysaccharides. Polysaccharides are molecules which comprise at least two monosaccharides.

A saccharose or sucrose comprises one molecule each of glucose and fructose.

Thus, at the same water content dextrose/sucrose mixtures have a glass transition temperature $T_g$ which is higher the lower the dextrose equivalent of the particular dextrose content, the higher the content of oligosaccharide molecules and the longer the chain lengths of the oligosaccharide molecules.

In use examples it has been found that for contents of min. 15% by weight of DE19 or min. 30% by weight of DE43, based on the anhydrous sugar phase or biopolymer phase, the glass transition temperature $T_g$ is sufficiently high to stabilize water contents of up to 10% by weight. Preferably, the matrix material of the spherical particle has a glass transition temperature of greater than 30° C., Preferably between 30° C. and 40° C., particularly preferably greater than 40° C. The particles thus can be further used and/or stored in a stable manner at temperatures of up to the glass transition temperature, that is to say at temperatures of up to at least 30° C., in particular as a constituent of a food suspension or consumable mass.

The embedded substances present in the matrix material allow the spherical, particles to combine with suitable ingredients and a composite powder which can be mixed in, for example, into a continuous fluid phase, to be obtained directly in this way. A flowable food suspension can be obtained in this manner.

The size, the taste properties and/or the nutrient content of the spherical particles can be established in a targeted manner. A composite powder is thus provided, with which a food suspension and/or a consumable mass which has a defined sensorial quality and which, for example, is simultaneously reduced in calories and/or enriched with taste-imparting and/or nutritive components can be produced.

Preferably, the spherical particle comprises matrix material to the extent of at least 5% by volume, further preferably to the extent of at least 10% by volume, further preferably to the extent of at least 30% by volume, further preferably to the extent of at least 50% by volume.

Preferably, the spherical particle comprises matrix material to the extent of at least 50% by weight, further preferably to the extent of at least 60% by weight.

In this manner the embedded substances can lie completely within the matrix material and do not impair the surface or the surface structure of the spherical particle.

The embedded substances are preferably present in the matrix material in finely divided form and have in particular a maximum extension in a spatial direction of up to 30 μm.

Preferably, the spherical particle comprises at least 0.1% by weight of embedded substances and/or at least 0.1% by volume of embedded substances.

Preferably, the spherical particle comprises a maximum of 60% by weight and/or a maximum of 60% by volume of solid, liquid or gaseous embedded substances at room temperature.

The spherical particle preferably has a diameter of less than 500 μm, further preferably of less than 100 μm and still further preferably of less than 50 μm. Spherical particles of this size can be readily mixed with other masses, in particular mixed into fluids.

In an advantageous embodiment of the invention the matrix material has a water activity of less than 0.7, in particular of less than 0.6 and preferably of less than 0.55, in particular between 0.05 and 0.45. Water activity is defined here as the quotient of the partial vapor pressure and saturated vapor pressure at room temperature (20° C.) under normal pressure (1,023 hPa). The water activity is a measure of the water freely available in a material. Only this content is involved actively in exchange with the environment, and is of great importance, for example, with respect to microbiological shelf life. At the same time, however, the water activity also has a considerable influence on the chemical behavior or foods.

Taking into account associated glass transition temperatures, spherical particles having such a water activity snow no significant after-crystallization effects or tackiness effects, in particular if the storage temperature is below the value of the glass transition temperature and the relative storage atmospheric humidity in the case of a non-packaged product is close to or below the water activity.

In an advantageous embodiment of the invention the biopolymer of the spherical particle comprises at least one sugar from the following group or consists thereof: a sugar having a dextrose equivalent of greater than 20, saccharose or sucrose, dextrose, polydextrose, maltodextrin, mannose, rhamnose, maltose, lactose, fructose, polyfructose, lactiolisomaltol, tagatose, saccharin, aspartame, acesulfame, cyclamate, neohesperidin, neotame, sucralose, stevioside, thaumatin or sugar alcohols, such as, for example, sorbitol, xylitol, mannitol, maltitol, erythritol or isomaltol, and/or combinations of these.

Advantageously, the matrix material comprises sugar having a dextrose equivalent of greater than 20 or consists thereof.

Preferably, cocoa constituents, milk constituents, fats, flavoring substances and/or nutritive components, e.g. vitamins or polyphenols, are embedded into the matrix material.

A cocoa constituent is understood as meaning the fat obtained from the cocoa bean or parts of the cocoa bean, cocoa powder or cocoa, that is to say a product of purified, shelled and roasted cocoa beans which are processed to powder, which comprises at least 20% of cocoa butter, based on the weight of the dry matter, and at most 9% of water, low-fat or reduced-fat cocoa powder, low-fat or reduced-fat cocoa, highly de-fatted cocoa powder, highly de-fatted cocoa, that is to say cocoa powder having less than 20% of cocoa butter, based on the weight of the dry matter, and moreover cocoa fibrous substance obtained from cocoa shells.

In the present application a fat is understood as meaning a component selected from the following group: plant fats, in particular cocoa butter or contents of cocoa butter, animal fats, in particular milk fat or contents of milk fats, synthetic fats, cocoa butter substitutes, cocoa butter substitute fats, cocoa butter equivalents according to Directive 2000/36/EC, Appendix II.

In the present application a milk constituent is understood as meaning a component which has been obtained from milk, in particular a milk dried mass from partially or completely dehydrated whole milk, partially or fully skimmed milk, lactose-free or lactose-reduced milk, cream, partially or completely dehydrated cream, lactose-free or lactose-reduced cream, butter or milk fat, for example a milk powder.

Preferably, essential constituents, in particular non-fat constituents, of a typical chocolate product and/or a typical chocolate product filling, in accordance with Directive 2000/36/EC, Appendix I, are incorporated into the spherical particle.

In addition or alternatively, the spherical composite particle can comprise one or more of the following components: vitamins, minerals, structure-forming agents, dietary or non-dietary fibers, fruit pieces, vegetable pieces, nut pieces, fruit core pieces, meat pieces, fish pieces, pieces of crustaceans, cocoa particles, cocoa constituents, milk, milk constituents, fruit juice or fruit puree, vegetable juice or vegetable puree, coffee extract or coffee flavoring, tea extract or tea flavoring, cocoa extract or cocoa flavoring, dyestuffs, dyestuff extracts, synthetic sweeteners, seasonings, artificial flavorings, and nature-identical flavorings, pharmaceutically active substances and other substances important in nutrition physiology.

Constituents which give the later consumable product a quite particular taste direction and/or impart certain functionalities can thus be added to the spherical composite particle.

In an advantageous embodiment of the invention the particle has a density of between 0.1 and 2.5 g/cm$^3$. The density of the spherical particle, in particular a low density value, can be established via the incorporation of gas bubbles or foam into the matrix material. High density values result from incorporation of mineral components.

The density can be measured with a conventional pycnometer, with which, for example, hydriol.SOD24, a dodecyl oleate ($C_{30}H_{58}O_2$), is used. Alternatively, a helium pycnometer which delivers the same density values for the particles according to the invention can be used.

The object is furthermore achieved by an agglomerate of spherical particles such as are described above, the size, shape and porosity of which are controlled.

The agglomerate according to the invention is itself a spherical particle having a rounded surface which is composed of the surfaces of individual spherical particles and in total is formed to the extent of more than 70% from convex part surfaces. The agglomerate has a sphericity of greater than 0.5, preferably of greater than 0.8.

The porosity, that is to say the hollow space volume content, of the spherical particle agglomerate according to the invention is preferably less than 40%, particularly preferably less than 25%.

The preferred diameter and shape criteria of the agglomerates according to the invention of spherical particles thus substantially correspond to those described above for the individual particles.

Preferably, an agglomerate comprises less than 20 spherical particles.

The object on which the invention is based is furthermore achieved by a method for producing spherical particles such as have been described above, or agglomerates such as have been described above.

For this, in a first step a biopolymer solution is first provided, for example by preferably complete dissolving of the constituents of a biopolymer, in particular from sugar components, preferably having a dextrose equivalent, of greater than 20, and optionally additional functionalizing substance components, such as, for example, surface-active substances, in a preferably aqueous fluid phase. The aqueous fluid phase can consist only of water. However, it can also comprise milk, milk constituents, fruit juice, vegetable juice, coffee, coffee extracts, tea and/or tea extracts. The aqueous fluid phase must be thoroughly homogenized.

The biopolymer solution is preferably composed such that in the subsequent shaping and separation process a matrix material which comprises amorphously solidified sugar having a dextrose equivalent of greater than 20 or consists thereof is formed.

Alternatively, liquid solutions of sugars, such as, for example, glucose syrup or sugar molasses, can be used, which are than adjusted, e.g. by dilution with watery to the dry matter content necessary for the spraying process.

The first step is carried out, for example, in a temperature-conditioned mixing container.

In a second optional step solid particles and/or volumes of liquid and/or volumes of gas are added to the solution. An emulsifier is optionally added to improve the dispersing quality.

The liquid can optionally furthermore be aerated, that is to say a gas and/or a foam-forming agent, such as PGE or milk proteins, are passed in, so that a foam can form.

The second step is undertaken, for example, in a membrane emulsifying/foaming device and/or in a torque-controlled rotor/stator disperser.

In a third step a shaping said separation process, in particular a drop formation process, is carried out. Preferably, a pressure- and temperature-controlled spray drying of the aqueous mixture or dispersion established in the second step is carried out. The drop formation process can be carried out in a spray process with one- or multi-component nozzles or alternatively by emulsifying or by means of a rotary disk.

Drops of aqueous solution in oil can also be formed by means of a one- or multi-component nozzle in which release of pressure of an aqueous phase is carried out in the same way as in a spray drying process, although not together with a gas but together with an oily phase.

The control of the spray pressure takes into account the pressure difference in the spray nozzle. This is proportional to the shear stress transferred, for which a critical value should not be exceeded to maintain the aqueous mixture or dispersion structure generated in the second step.

The temperature control ensures that the spray process is carried out sufficiently above the glass transition temperature of the continuous aqueous mixture which forms the matrix material of the particle, in order to achieve a sufficiently complete break-up of the spray jet and therefore the formation of small, round spray particles and thereafter solidification thereof by drying.

During spray drying of the aqueous continuous phase or dispersion formed in the first and/or second step, the residual water content, the water activity and/or the particle size are established via the spray pressure, the atomization pressure, the throughput volume stream, the mass stream of the dispersion, the gas volume stream, the temperature of the dispersion, the gas temperature and the pressure and the temperature in the spray chamber.

The drying which is sufficiently rapid according to the invention and the slow crystallization kinetics established for the biopolymer allow the formerly aqueous fluid phase (dispersion) to solidify in a stable, amorphous state, without significant after-crystallization occurring.

The third step can be carried out in a spray dryer with regulation of the spray pressure difference and temperature/moisture control of the drying air.

Preferably, a shear stress-controlled treatment is carried out by controlling or regulating the fluid pressure difference in one-component nozzles or the gas/fluid pressure difference in two-component nozzles via the spray nozzle as a regulating variable while keeping the disperse structure parameters constant.

The particles, which can be free-flowing, can be collected, stored and/or further processed.

The storage conditions are coordinated to the composition of the particles. If the particles have a water activity of less than 0.3 or an equilibrium water content of the matrix of less than 10% by weight, the particles are stable at room temperature under normal pressure, in the case of particles having a higher water activity and for longer-term stabilizing of the particles, the storage temperature can be lowered, the storage pressure increased, and a dehumidifying of air, an after-drying, an addition of desiccant and/or a storage in an air- and/or moisture-tight packaging can be carried out.

Preferably, the particles are stored at a relative humidity (quotient of vapor pressure and saturated vapor pressure over water, in air this corresponds to the relative atmospheric humidity) of less than 0.4 and at temperatures of less than 30° C., preferably at a relative humidity of less than 0.33 and/or preferably at room temperature, e.g. 20° C.

The particles can be stored, for example, in a silo and/or in an air- and/or moisture-tight bag.

The object on which the invention is based is moreover achieved by a food suspension, wherein the food suspension comprises a substantially homogeneous carrier material into which spherical particles are embedded. The carrier material can be solid or liquid. It can be in paste-like form, and pourable and/or shapeable.

Preferably, the food suspension substantially comprises the carrier material and spherical particles embedded therein.

In the context of the present application a food suspension is a semi-finished product which can be further processed to a consumable product or end product, optionally also as a part component, for example as a filling.

The spherical, particles are in particular spherical particles as described above and/or agglomerates as described above. According to the invention, the spherical particles comprise a matrix material of an amorphously solidified biopolymer, for example a protein, in particular a whey protein. Preferably, the biopolymer is a sugar, further preferably a sugar having a dextrose equivalent of greater than 20.

Advantageously, the matrix material comprises sugar having a dextrose equivalent of greater than 20 or consists thereof.

In an advantageous embodiment of the invention the spherical particles consist of amorphously solidified sugar having a dextrose equivalent of greater than 20.

The spherical particles, in particular composite particles as described above, are preferably suspended in a fatty continuous fluid. Fats which are preferably employed are: cocoa buttery milk fat, further vegetable fats, artificial or synthetic fats, further animal fats, cocoa butter substitutes, cocoa butter substitute fats, cocoa butter equivalents, in accordance with Directive 2000/36/EC, Appendix II.

Advantageously, the food suspension comprises spherical particles having a content of greater than 5% by volume, preferably greater than 20% by volume and further preferably greater than 35% by volume. Preferably, the volume content of the spherical composite particle fraction is established at between 5 and 85% by volume, further preferably between 20 and 80% by volume, and even further preferably between 35 and 75% by volume.

Preferably, the spherical particles and the carrier mass are present with a weight ratio of between 0.01:1 and 100:1, preferably between 0.01:1 and 5:1.

The properties of the food suspension, in particular the sensorial properties, such as the texture, the consistency and the taste, are fixed decisively by the spherical particles.

In an advantageous embodiment the matrix material of the particles has a water activity of less than 0.7, in particular of less than 0.6, preferably of less than 0.55, in particular less than 0.45.

Preferably, the matrix material of biopolymer has a water content of less than 10% by weight (equilibrium moisture content at 20° C.).

Preferably, the biopolymer consists of a sugar, further preferably a sugar having a dextrose equivalent of greater than 20, and/or comprises at least one sugar from the following group: a sugar having a dextrose equivalent of greater than 20, saccharose or sucrose, dextrose, polydextrose, maltodextrin, mannose, rhamnose, maltose, lactose, fructose, polyfructose, lactiolisomaltol, tagatose, saccharin, aspartame, acesulfame, cyclamate, neohesperidin, neotame, sucralose, stevioside, thaumatin or sugar alcohols, such as, for example, sorbitol, xylitol, mannitol, maltitol, erythritol or isomaltol, and/or combinations thereof.

Preferably, solid particles and/or volumes of liquid and/or volumes of gas are embedded into the matrix material of the solid particles.

Preferably, a constituent of cocoa, a milk constituent, a fat, a flavoring substance, a nutritively relevant additional, component or a combination thereof is embedded into the matrix material of the spherical particle.

In an advantageous embodiment of the invention at least 30% (based on the volume) of the spherical particles have a size of less than 500 µm, preferably less than 100 µm, still further preferably less than 50 µm. Preferably, at least 60% (based on the volume) of the particles have a diameter of between 2 µm and 40 µm, in particular 80% of the volume of the particles are larger than 1 µm.

It has been found that it is sufficient for particles of which at least 80% (based on the volume) are larger than 2 µm, which are spherical and comprise a matrix material of amorphously solidified biomaterial are present in the food suspension. In a particular embodiment it has been found that it is advantageous for the flow properties if at least 50% (based on the volume) of all the particles are larger than 5 µm and spherical and/or at least 5% (based on the volume) of all the particles are larger than 20 µm and spherical, in particular at least 3%, preferably at least 10%, are larger than 30 µm.

Preferably, the size distribution of the spherical particles has a distribution width, described by the standard deviation $s=(x_{90.3}-x_{10.3})/x_{50.3}$, of less than 20, preferably less than 5 and further preferably less than 3.

In an advantageous embodiment of the invention the carrier material is a continuous W/O (water in oil) or O/W/O emulsion having disperse subphase contents of 5-80% by volume, preferably 20-70% by volume, and further preferably of 30-60% by volume.

Preferably, the fatty continuous fluid phase comprises disperse subphases, e.g. water and/or inner fat drops in O/W/O emulsions, in which quality-determining substance components for influencing the flavor and/or taste and/or nutritive benefit are incorporated.

Particularly advantageously, the carrier material is a fatty continuous phase which comprises triglycerides which crystallize out in defined contents in a temperature range of 20-40° C., in particular are largely crystallized at 20° C. A food suspension having such a carrier material is suitable for producing a high-quality chocolate product and/or a filling for a filled chocolate product.

Depending on the content of triglycerides, a fluid, semi-solid or solid product is obtained under storage and/or consumption temperature conditions.

Particularly preferably, the carrier material comprises cocoa butter or consists thereof.

Advantageously, apart from the spherical particles, further hydrophilic or hydrophobic particles, for example sugar particles, in particular sugar crystals, or high-melting fat crystals, are embedded into the carrier material.

The carrier material is preferably a fatty continuous mass, and the carrier material can comprise further constituents, for example vitamins, minerals, structure-forming agents, dietary or non-dietary fibers, fruit pieces, vegetable pieces, nut pieces, fruit core pieces, meat pieces, fish pieces, crustacean pieces, cocoa particles, cocoa constituents, milk, milk constituents, fruit juice or fruit puree, vegetable juice or vegetable puree, coffee extract or coffee flavoring, tea extract or tea flavoring, cocoa extract or cocoa flavoring, dyestuff, dyestuff extract, synthetic sweeteners, seasonings, artificial and/or nature-identical flavorings, pharmaceutically active substances and other substances important in nutrition physiology. The constituents mentioned can also be incorporated into the matrix material of the spherical particles.

Preferably, the mass and/or number of the embedded constituents which are not spherical is less than the mass and/or number of the spherical particles and/or the average size of the embedded constituents is smaller than the average size of the spherical particles, so that the sensorial quality is not impaired.

The density of the food suspension is between 0.3 and 2 g/cm$^3$, preferably between 0.5 and 1.8 g/cm$^3$.

The object on which the invention is based is furthermore achieved by a method for producing a food suspension as described above having the following method steps:

Spherical particles are first provided, in particular spherical particles as described above.

The particles can be produced by a method as described above, wherein solid particles and/or volumes of liquid and/or volumes of gas are added only optionally in a second step.

The spherical particles are subsequently suspended in a carrier material.

For this, the homogeneous, preferably shear stress-controlled, mixing in of spherical particles, preferably of amorphously solidified composite particles, into a preferably fat-based continuous fluid phase is carried out. This can correspond to a pure fat system or a fatty continuous W/O or O/W/O emulsion. This suspension or suspension/emulsion mixture forms the food suspension or consumable mass according to the invention described above in the fluid to semi-solid form thereof.

The shear stress-controlled mixing in can be carried out by suitable recording and regulation of the process parameters such as torque, power input, speed of rotation, current uptake, quantity of the product batch to be processed, mass streams, number of components to be mixed, amount of the components to be mixed, sequence in time of the addition of the components to be mixed. Individual process parameters or combinations thereof can be used here.

The dispersing, spraying and mixing processes are preferably controlled and regulated under shear stress control, so that as a result of taking into account critical, stress limits it is ensured that the product structure is established without damage due to over-stressing.

The mixing in is preferably carried oat in a torque- and/or power-controlled mixer.

The control or regulation of the speed of rotation as a regulating variable of the rotating dispersing or mixing tools is effected while keeping a defined torque, which is sub-critical from the structural point of view, constant as a reference variable and therefore results in the disperse structure parameters being kept constant as a control/regulating variable.

In addition, further constituents can be suspended in the carrier material. This can be effected before or after addition of the spherical particles.

In a subsequent step a precrystallization of the fatty continuous fluid phase of the dispersion produced in the preceding step can be carried out by (i) conventional stirring crystallization with alternating temperature conditioning or by (ii) novel seed crystallization on mixing in of tailor-made seed crystals in powder or suspension form.

The precrystallization of the pure fatty phase or contents thereof or of the fatty continuous fluid phase or contents thereof is carried out, for example, in a cold spraying tower, in a seed crystallizer or in a conventional temperature conditioning step.

Finally, the precrystallized mass can be poured into a mold and solidified further with cooling and further crystallization of the continuous fatty phase.

This is preferably effected in with a pouring machine and/or in a cooling tunnel.

In the end state a suspension-based food product is present at 20° C. in solid to soft consistency.

In a further step an end product storage can optionally be carried out at a temperature which is less than the glass transition temperature of the amorphously solidified spherical particles incorporated, in particular composite particles, and which at the same time is in the region of or below the melting temperature of the fatty continuous phase into which the particles have been mixed or are present embedded in the end product, so that up to 100% by weight of the fatty continuous phase is present in solid form.

The object on which the invention is based is moreover achieved by a consumable mass which includes an agglomerate of particles, wherein at least some of the particles are spherical particles as described above which comprise a matrix material of an amorphously solidified biopolymer having a water content of less than 10% by weight, in particular a sugar, preferably having a dextrose equivalent of greater than 20, or consist thereof and wherein solid particles and/or volumes of liquid and/or volumes of gas are embedded into the matrix material.

The agglomerated particles adhere to one another on their surfaces. Depending on how firmly the particles adhere to one another, the consumable mass still flows, is paste-like or is solid.

The consumable mass likewise comprises or consists of a composition sintered from spherical and in particular also still further particles.

Preferably, some of the particles are fat particles. The fat particles preferably comprise cocoa butter or cocoa butter having a content of milk fat or another fat, which is preferably substantially solid at room temperature (20° C.).

The spherical particles thus are not present in a homogeneous fat mass but are surrounded by fat particles.

It has been found that this consumable mass is also suitable for producing a food product and likewise has good sensorial properties.

Advantageously, the fat particles comprise triglycerides which are at least partially crystallized at 20° C.

Preferably, the ratio of the number of spherical particles to the number of further particles is between 0.1:1 and 100:1, preferably between 0.1:1 and 50:1, further preferably between 0,1:1 and 30:1.

The density of the consumable mass is preferably between 0.3 and 1.8 g/cm$^3$.

The object on which the invention is based is moreover achieved by a method for producing a consumable mass as described above having the following method steps:

Spherical particles are first provided, in particular by a method as described above, wherein solid particles and/or volumes of liquid and/or volumes of gas are added only optionally in a second step.

Furthermore, further particles are provided, in particular fat particles, in particular a fat powder.

Such a fat powder is preferably produced by spraying a precrystallized fatty continuous suspension or fat melt into a cold atmosphere, for example in a cold spraying tower.

For this, a fat mass, in particular cocoa butter or cocoa butter having a content of milk fat or another fat, is first melted, and pre-temperature conditioned, so that the fat mass preferably comprises crystal seeds of the $\beta_V$ crystal and/or $\beta_{VI}$ crystal type. The spraying process is then carried out. The resulting fat powder is free-flowing and preferably includes particles having a size of smaller than 200 μm.

The fat particles are in particular provided at the same time as the spherical particles.

Further in particular, the further particles are produced in the same process as the spherical particles, for example sugar solution and fat mass are spray dried, preferably simultaneously.

The spherical particles and the further particles, in particular fat particles, are mixed.

The shaping of the powder mixture of this type of spherical particle, in particular amorphously solidified composite particle and fat particles, is carried out by tablet-making or sintering with application of pressure and optionally an additional temporary moderate increase in temperature, and/or with addition of aqueous liquid and/or with addition of oil and/or with addition of emulsion.

The volume-based mixing ratio of spherical particles, in particular amorphously solidified composite particles, and fat particles is between 1:20 and 50:1, preferably between 1:10 and 20:1.

The mass-based mixing ratio of spherical particles, in particular amorphously solidified composite particles, and fat particles is between 1:10 and 100:1, preferably between 1:5 and 40:1.

The particles are preferably formed into tablets or sintered under a pressure of greater than 20 kPa, further preferably greater than 100 kPa and even further preferably greater than 300 kPa and thereby as a general rule brought into the form of a food product, for example in slab or bar form.

The food product can be stored as already described above for the suspension-based food product.

The particle mixture can also be filled into a skin, or a shell produced from another consumable mass and a multi-component product can thus be produced.

The object on which the invention is based is furthermore achieved by a food product, in particular a chocolate product, which comprises a rood suspension and/or a consumable mass as described above.

Surprisingly, with a food product according to the invention having spherical, amorphously solidified particles, which in particular comprise sugar as well as cocoa constituents and milk constituents, and cocoa butter as a surrounding fatty continuous phase or as a further particle variety, a sensorial quality is achieved which is comparable to that achieved with a conventional chocolate product which comprises substantially non-spherical, angular particles, wherein significantly larger particles, which comprise sugar, and a significantly lower cocoa butter content are present in the food product according to the invention.

Sugar crystals present in a conventional chocolate product have a diameter of about 1-25 μm. In particular, at least 80% by volume of the sugar crystals are larger than 1 μm and a maximum of 10% by volume are larger than 25 μm. The diameter stated here relates to a particle size determined, by laser diffraction spectroscopy.

A comparable sensorial quality, in particular with respect to the roughness found, can be realized with a consumable product in which the consumable mass comprises spherical particles of which at least 10% by volume have a diameter which is greater than 25 μm, in particular greater than 30 μm, further in particular greater than 35 μm, further in particular greater than 40 μm.

At the same time the use of these larger, spherical particles has a significantly advantageous effect with respect to a greatly reduced viscosity at the same solids volume content.

It has been found that for spherical composite particles which are present dispersed in a preferably fatty continuous fluid phase the rheological properties described via the viscosity function $\eta(\dot{\gamma})$ and the yield point $\tau_0$ show significantly reduced values of these material functions compared with suspensions of the same composition in which the components contained in the spherical particle are present in an angular, that is to say not spherical according to the invention, particle form, and separately, but with the same or at least a comparable particle size distribution.

For example, the spherical composite particles are present dispersed in a preferably fatty continuous fluid phase, wherein for a typical recipe for chocolate having 0.5% by weight of lecithin (amount of the emulsifier, based on the amount of emulsifier and the amount of fatty phase) as the emulsifier and a solids volume concentration of 55% by volume, the viscosity at a defined shear rate relevant to use of 10 s$^{-1}$ is lowered by a factor of greater than 1.5, preferably greater than 2.5, and further preferably greater than 4 for the suspension system according to the invention compared with a suspension of the same composition in which the components contained in the spherical particles are present in an angular, that is to say not spherical according to the invention, particle form and separately, but with the same or at least a comparable particle size distribution.

In an analogous manner, for spherical composite particles which are present dispersed in a preferably fatty continuous fluid phase having a typical solids volume concentration for chocolate of 55% by volume, the yield point $\tau_0$ without the addition of emulsifier is lowered by a factor of greater than 1.5, preferably by the factor of greater than 5, and further preferably by the factor of greater than 10 for the suspension system according to the invention compared with a suspension of the same composition in which the components contained in the spherical particles are present in an angular form, that is to say not a spherical, according to the invention, particle form, and separately, but with the same or at least a comparable particle size distribution.

This in turn can be utilized by establishing the viscosity comparably to conventional chocolate products in the form of a massive reduction of the continuous fatty phase, for example cocoa butter. A lower content of the continuous fatty phase in the food product results in a correspondingly reduced energy density, that is to say a reduction in calories.

Surprisingly, it has furthermore been found for food suspensions having spherical particles according to the invention that the use of emulsifiers allows a further influencing on the flow properties of the food suspension than is the case for conventional chocolate systems.

For example, when the spherical, amorphously solidified composite particles according to the invention are used, it is found chat the addition of lecithin, a typical emulsifier for chocolate, has the effect not of an improvement but rather of a significant deterioration in the flow properties.

In particular, it is found that for spherical composite particles which are present dispersed in a preferably fatty continuous fluid phase having a solids volume concentration typical of chocolate of 55% by volume the yield point $\tau_0$ with the complete saving of lecithin as an emulsifier is lowered by a factor of greater than 10, preferably by the factor of greater than 20, and further preferably by the factor of greater than 50 for the suspension system according to the invention compared with a suspension having 0.3-0.5% by weight of added lecithin (amount of the emulsifier, based on the amount of emulsifier and amount of fatty phase) with otherwise the same composition in which, however, the components contained in the spherical particles are present in an angular form, that is to say not a spherical, according to the invention, particle form, and separately, but with the same or at least a comparable particle size distribution.

On the other hand, the addition of PGPR (polyglycerol polyricinoleate), another conventional emulsifier typical for chocolate, to a food suspension having spherical particles according to the invention has the effect of an extremely intensified decrease in the yield point down to complete disappearance thereof.

It has been found in particular that for spherical composite particles which are present dispersed in a preferably fatty continuous fluid phase having a solids volume concentration typical of chocolate of 55% by volume the yield point $\tau_0$ with the addition of PGPR (polyglycerol polyricinoleate) emulsifier is lowered by a factor of greater than 5, preferably by the factor of greater than 10, further preferably by the factor of greater than 100 for the suspension system according to the invention compared with a suspension of the same composition in which the components contained in the spherical particles are present in an angular form, that is to say not a spherical, according to the invention, particle form, and separately, but with the same or at least a comparable particle sixe distribution.

This opens up new horizons in the influencing and adjustment of the flow properties of suspension systems, in particular chocolate-like suspension systems, using the spherical, amorphously solidified composite particles according to the invention and appropriate emulsifiers.

Surface-active substances (emulsifiers) which are arranged on the smooth disperse surface of the spherical composite particles already achieve, as a result of the round particle form and the smooth, amorphous biopolymer particle surface, in particular sugar particle surface, at very low concentrations of greater than 0.01% by weight (amount of the emulsifier, based on the amount of emulsifier and amount of fatty phase), preferably of greater than 0.05% (amount of the emulsifier, based on the amount of emulsifier and amount of fatty phase), a decisive influencing of the particle-particle interactions in the substance system, which manifests itself in a significantly measurable influencing of the viscosity.

To achieve a decisive influencing of the particle-particle interaction for typical emulsifiers which are conventional in chocolate systems, such as lecithins or PGPR (polyglycerol polyricinoleate), the concentration thereof can be reduced by a factor of greater than 2 to 5, preferably by a factor of greater than 10.

The potential of the reduction in the fatty phase and accompanying reduction in the calorie density is therefore increased significantly.

If spherical composite particles are present dispersed in a preferably fatty continuous fluid phase, as a result of the rheological properties, such as viscosity function $\eta(\dot\gamma)$ and yield point $\tau_0$, which have been shifted to lower values, a reduction in the content of the continuous fatty phase takes place, which compensates this reduction in the rheological parameters. Savings in the calorie-rich and costly fatty phase for typical chocolate products of greater than 5%, preferably of greater than 10%, further preferably of greater than 25% can thus be achieved (percentage data based on calories). In this context a fat reduction of 15% by volume alone already corresponds to a calorie reduction of 24%.

As a result of a fat reduction at a level of 10-25% (based on the total mass) to compensate the lowering according to the invention, and by using W/O emulsions as the fatty continuous suspension phase having water contents of 50-80% by weight (based on the fatty continuous fluid phase), a total fat reduction of 20-40% and, including the embedded water in the amorphous, spherical composite particles of less than 10% by weight, an accompanying calorie redaction of 25-50% can take place compared with conventional products identical in the recipe of the base chocolate, and rheological parameters which are comparable to rheological parameters of masses having conventional constituents are thereby achieved.

A high quality consumable product having a reduced calorie content can therefore be produced with a significant reduction in costs on the basis of the spherical, amorphously solidified composite particles.

Spherical composite particles which are present dispersed in a preferably fatty continuous fluid phase, wherein all the disperse and dissolved components incorporated into the spherical particles and the fatty continuous phase are coordinated such that a chocolate system, which has the quality characteristics of a premium product results, lead to a food product having a calorie reduction of at least 20-40%.

The consumable product can be a chocolate slab, a praline, a cake or baked goods having a chocolate filling or chocolate covering and/or chocolate coating, a bar or other product forms.

The invention further relates to a food suspension, in particular as described above, having, suspended in a fatty phase, solid particles which comprise to the extent of more than 90% constituents selected from the group consisting of cocoa butter, sugar and cocoa, characterized in that the food suspension comprises less than 50% by volume of cocoa butter and the yield point $\tau_0$ at 40° C. is less than 10 Pa. In particular, the fatty phase comprises less than 0.5% of emulsifier.

In particular, the food suspension comprises to the extent of at least 50% by weight, preferably at least 65% by weight, particularly preferably at least 70% by weight, solids, which in their turn comprise sugar and/or biopolymers and/or cocoa solids and/or milk constituents, wherein 50% of the volume of all the particles are larger than 5 μm and have a spherical shape.

Preferably, 50% of the volume of all the particles are larger than 5 μm and spherical, wherein a maximum of 10% of the volume of all the particles are larger than 60 μm.

The invention further relates to a food suspension, which comprises solids and a substantially homogeneous carrier material, in particular as described above, wherein the carrier material comprises 0.01-5% by weight of PGPR and 20-50% by weight of a liquid fat, wherein the food suspension has a yield point $\tau_0$ at 40° C. of 0.001-20 Pa.

Liquid fat is understood in particular as meaning a fat which, is liquid in a temperature range of from −20° C. to +60° C.

The invention further relates to a food suspension which comprises solids and a substantially homogeneous carrier material, in particular as described above, wherein the carrier material comprises 20-50% by weight of a liquid fat, comprises no emulsifier and wherein the food suspension has a yield point $\tau_0$ at 40° C. of 0.01-20 Pa.

The object according to the invention is moreover achieved by a method for establishing the shear stress in suspensions having spherical particles, in particular as described above, wherein the shear stress is increased, preferably up to a given, desired value, by addition of lecithin.

In conventional chocolate masses lecithin is used as a shear stress-lowering addition. The use of suspensions having spherical particles, in particular as described above, allows the increasing and therefore a precise adjustment of the shear stress by targeted addition of lecithin.

The consistency of the mass therefore can be specified precisely, which is advantageous for the processing and for the end use. By late addition of lecithin the shear stress can also initially be kept low and first brought to a higher desired value towards the end of the processing.

The invention is explained in more detail in the following in exemplary embodiments and with the aid of drawings.

BRIEF DESCRIPTION OF THE INVENTION

The FIGS. show

Figure 1B:
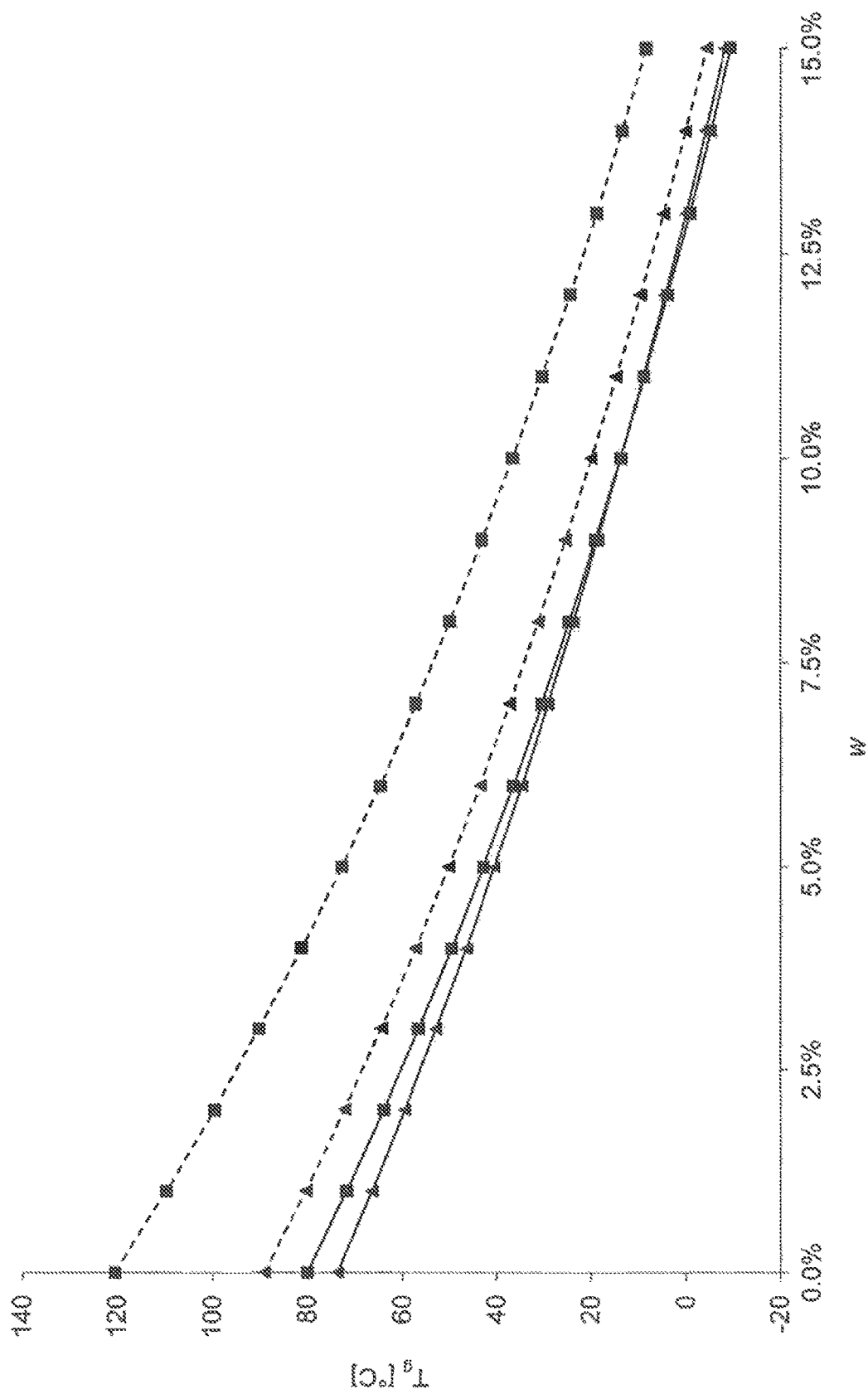
Figure 2A:
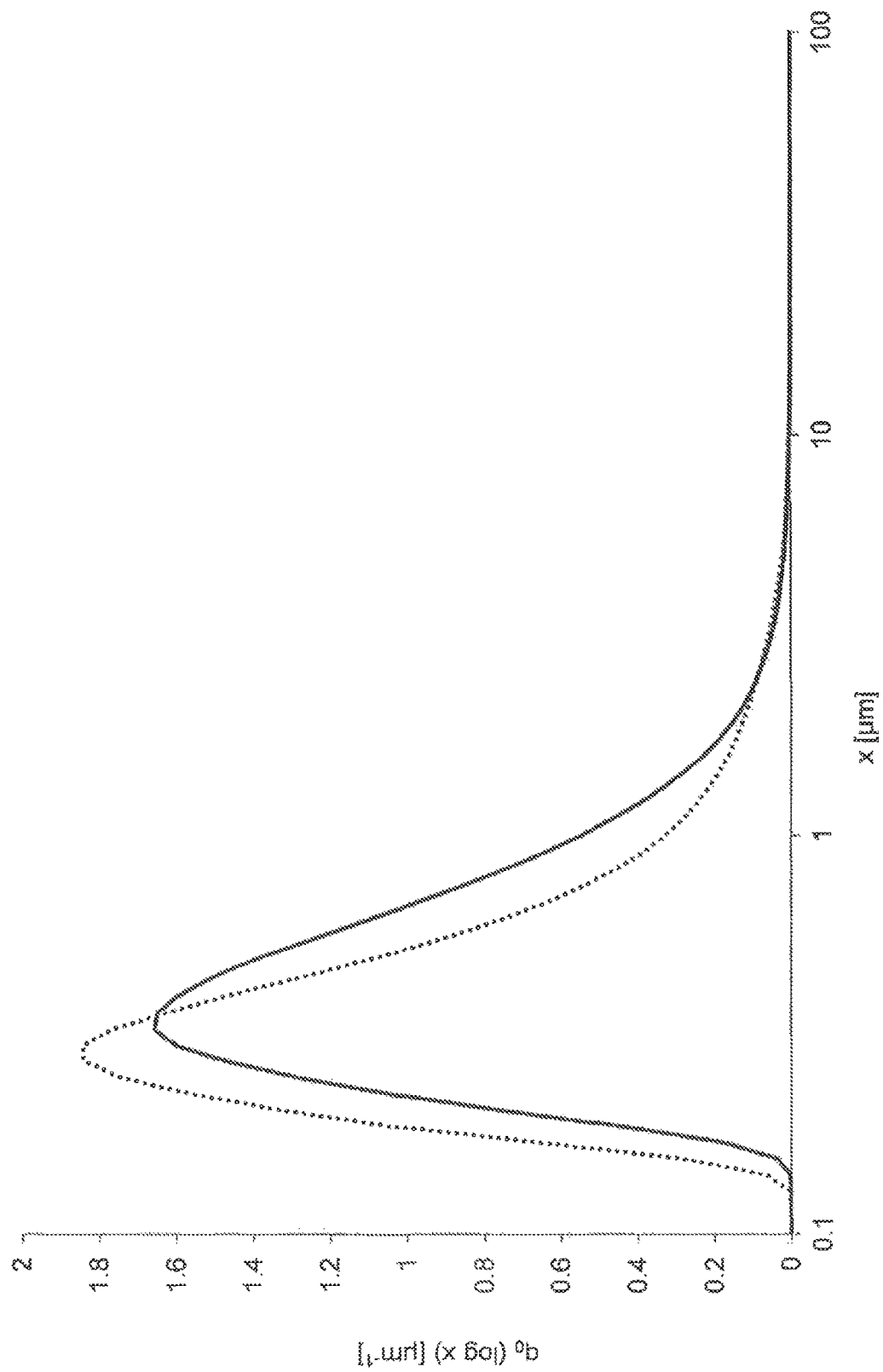
Figure 2B:
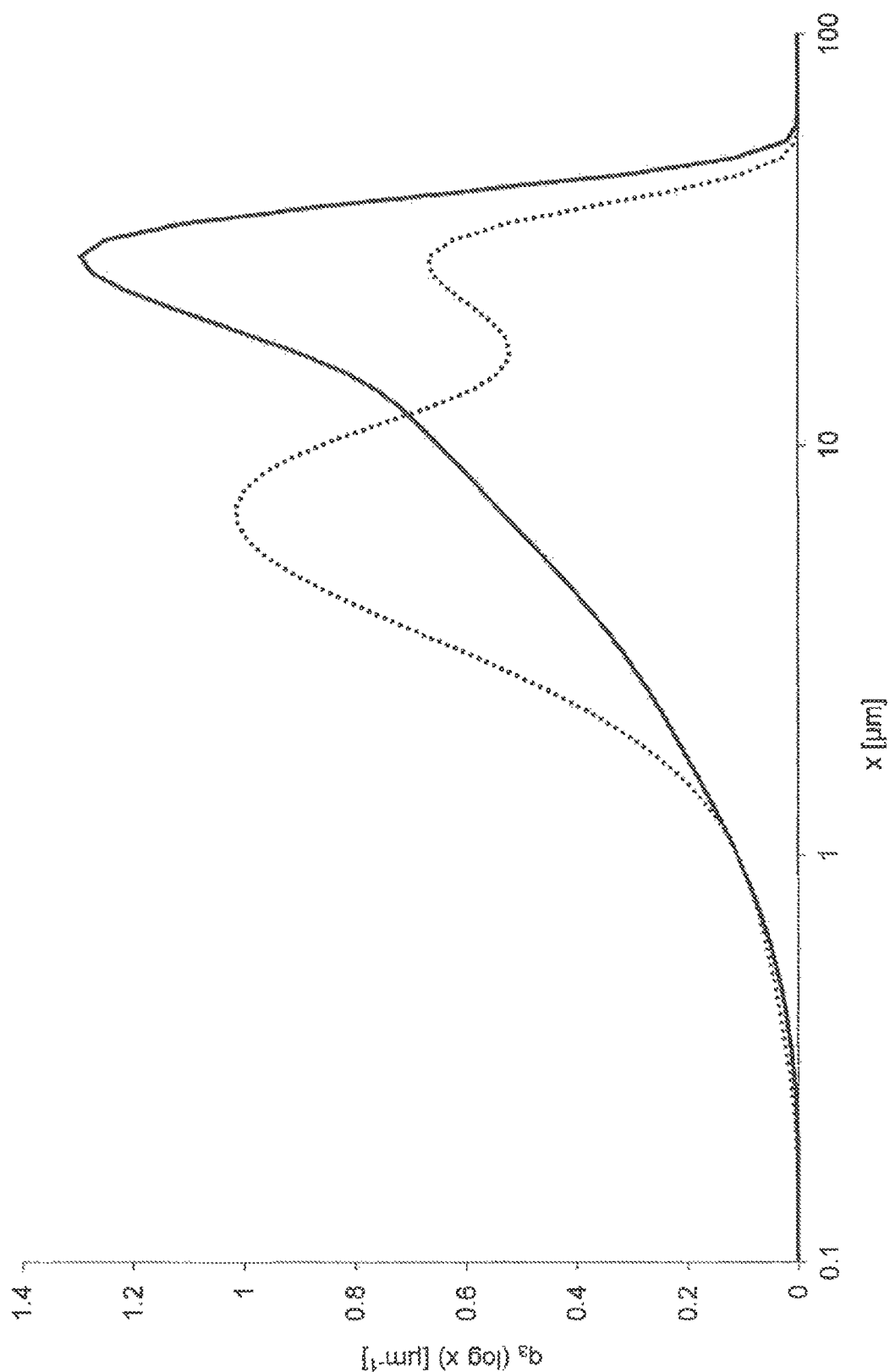
Figure 3:
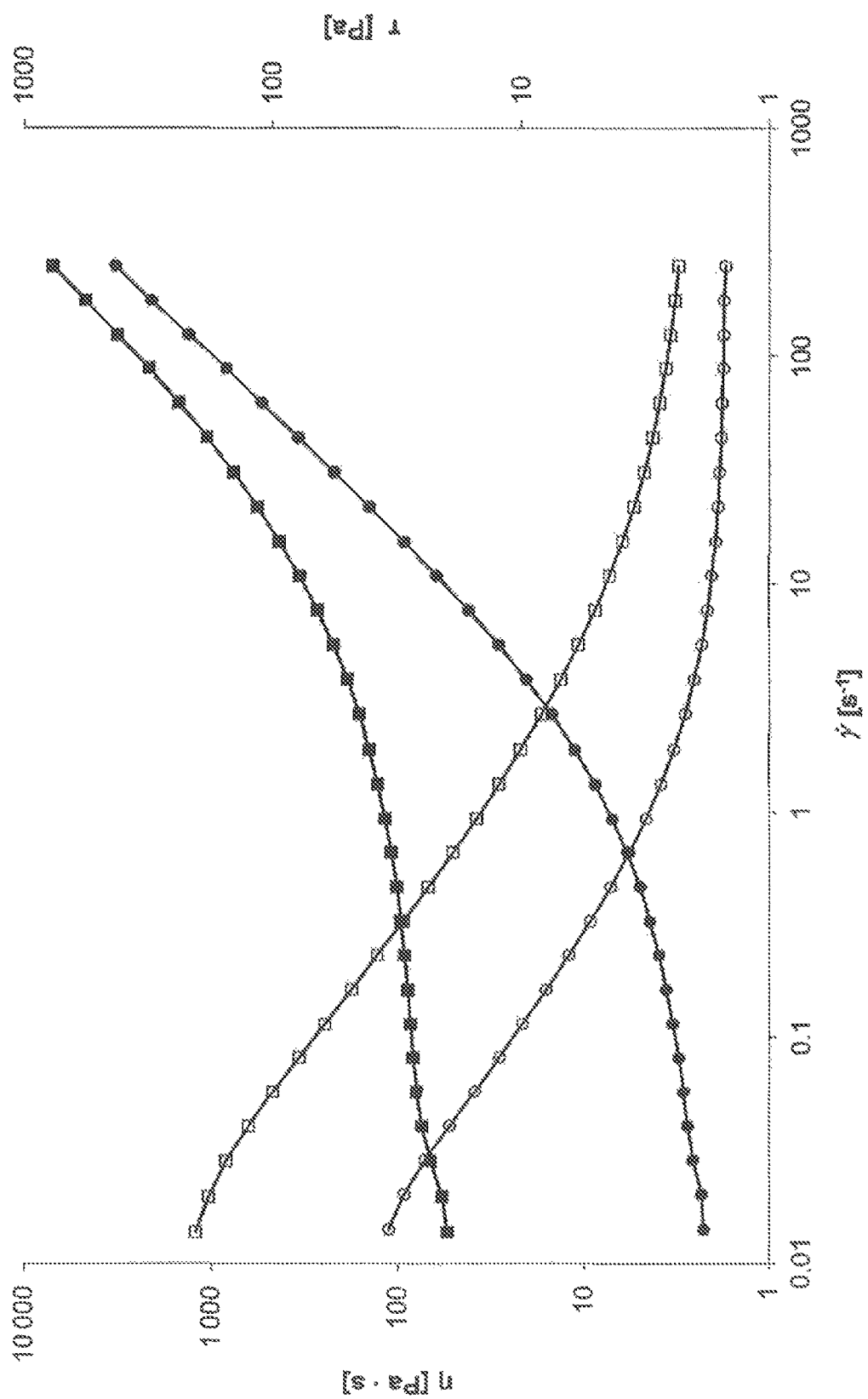
Figure 4:
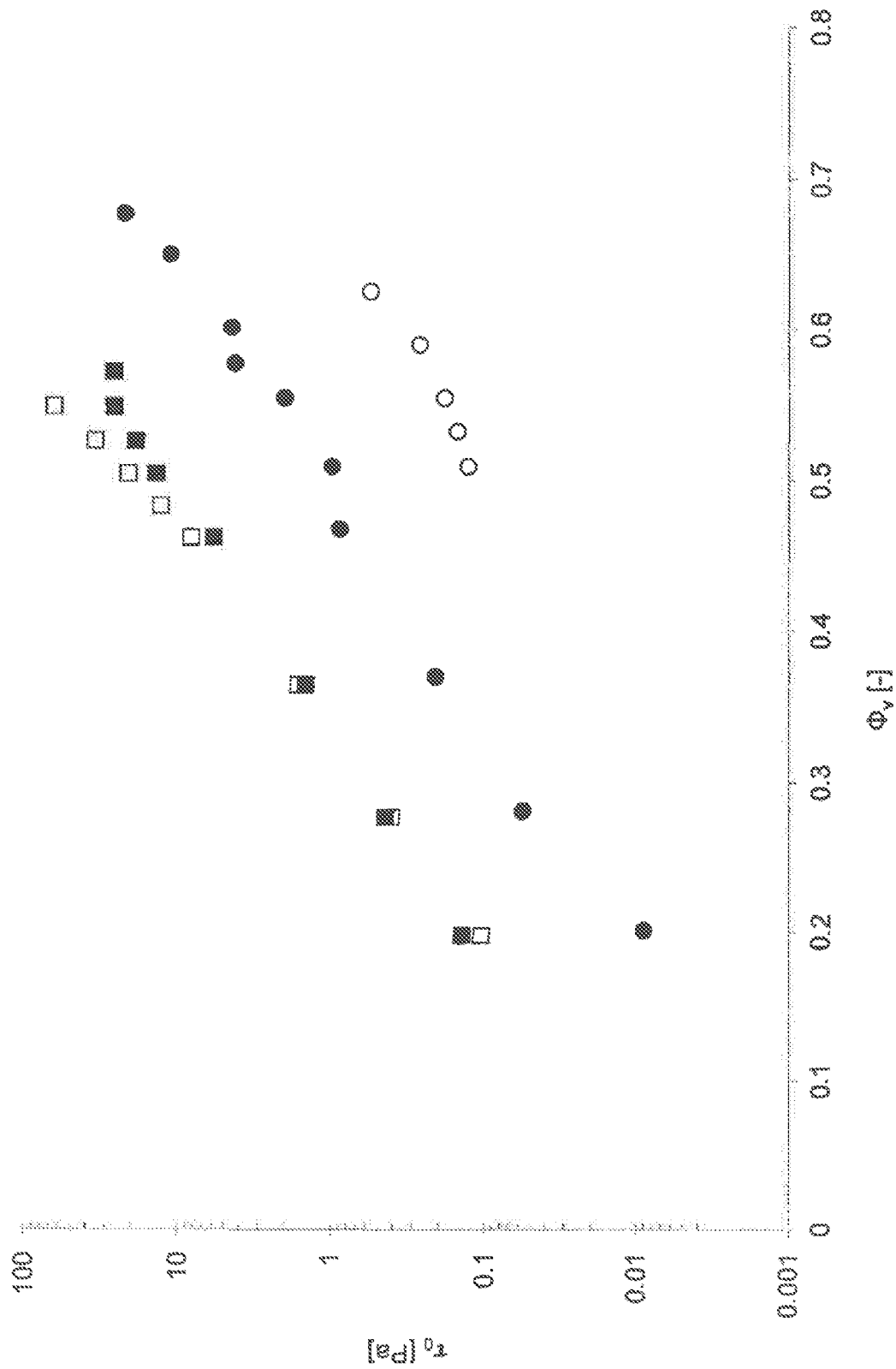
Figure 5A:
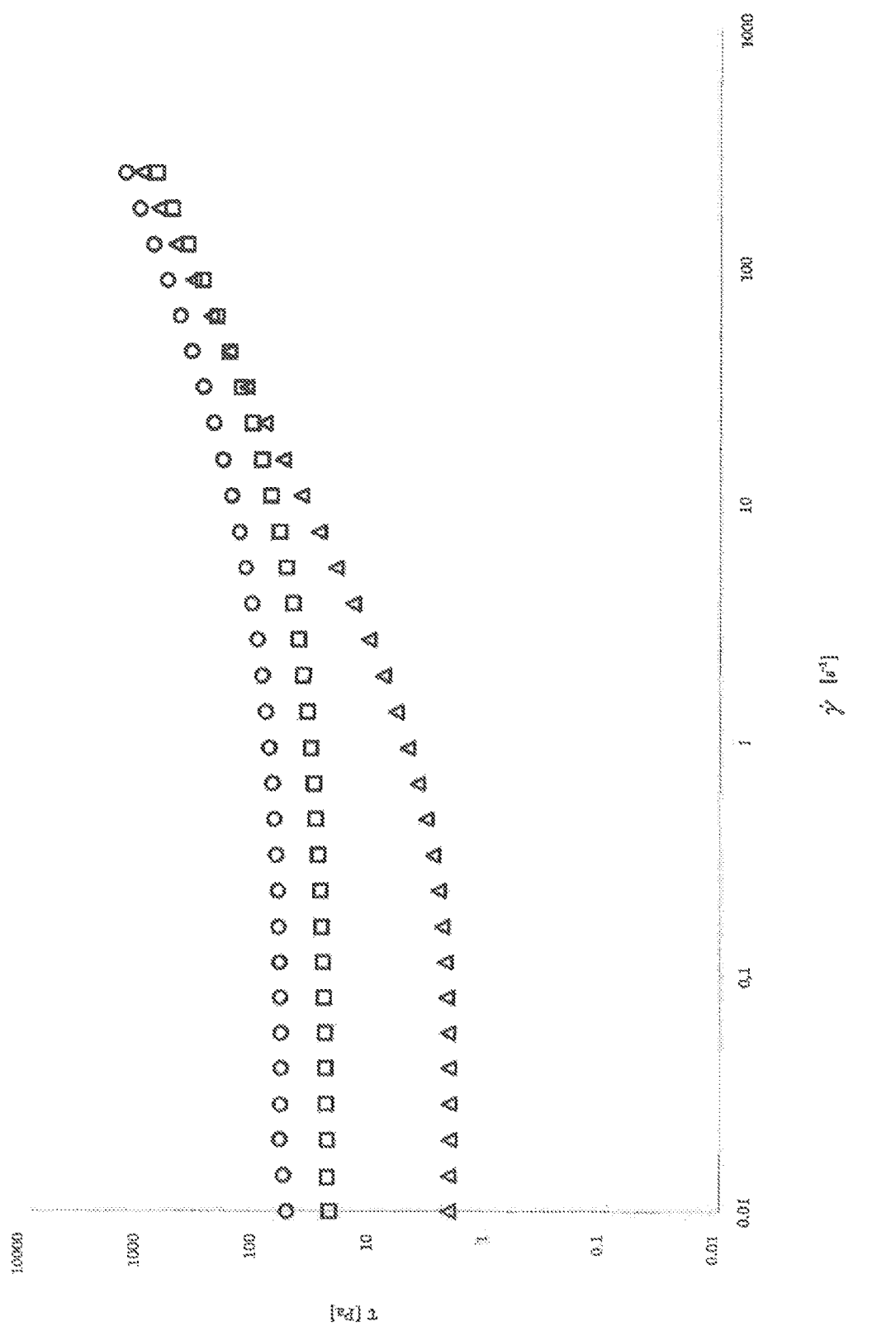
Figure 5B:
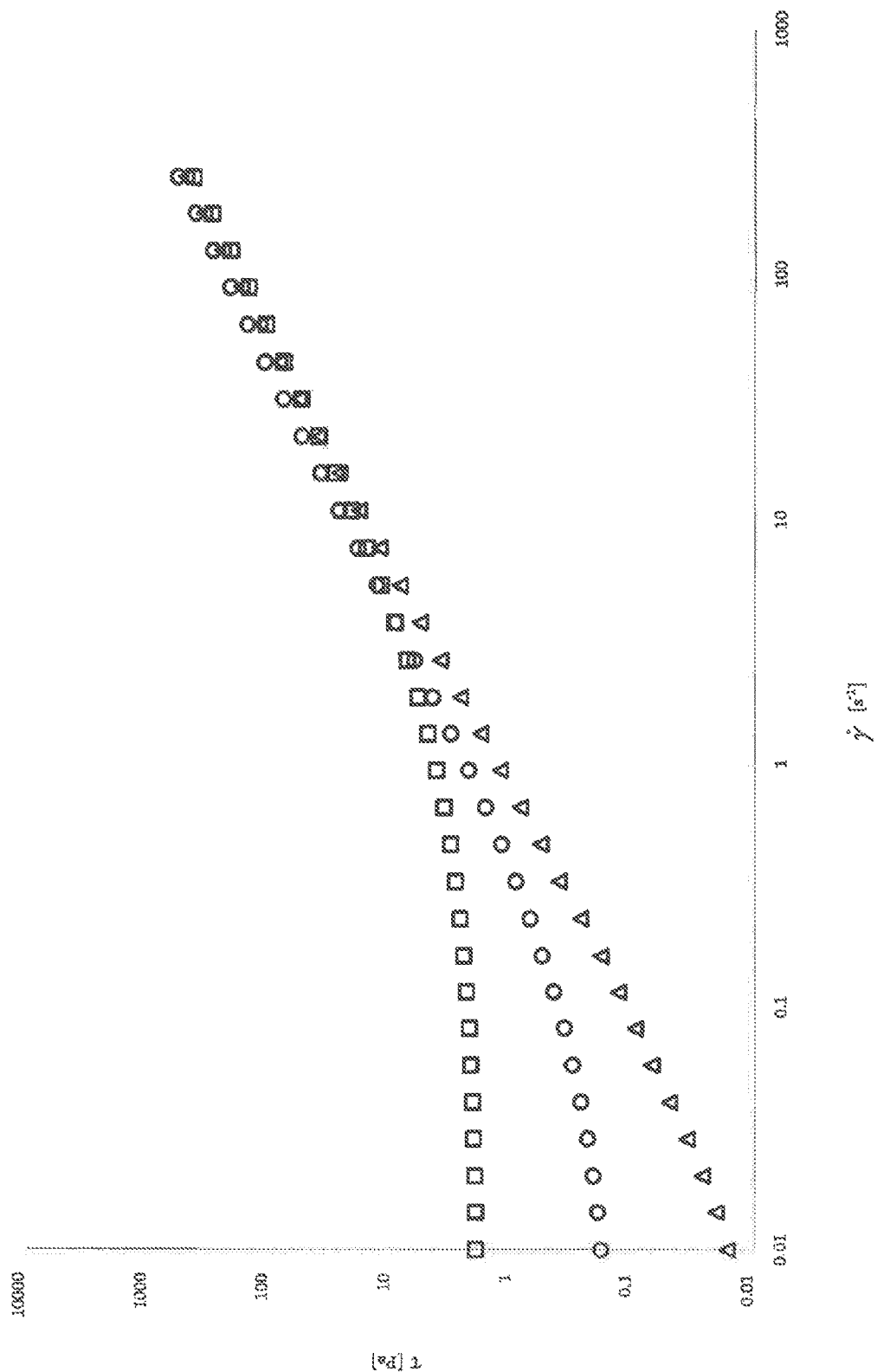
Figure 6:
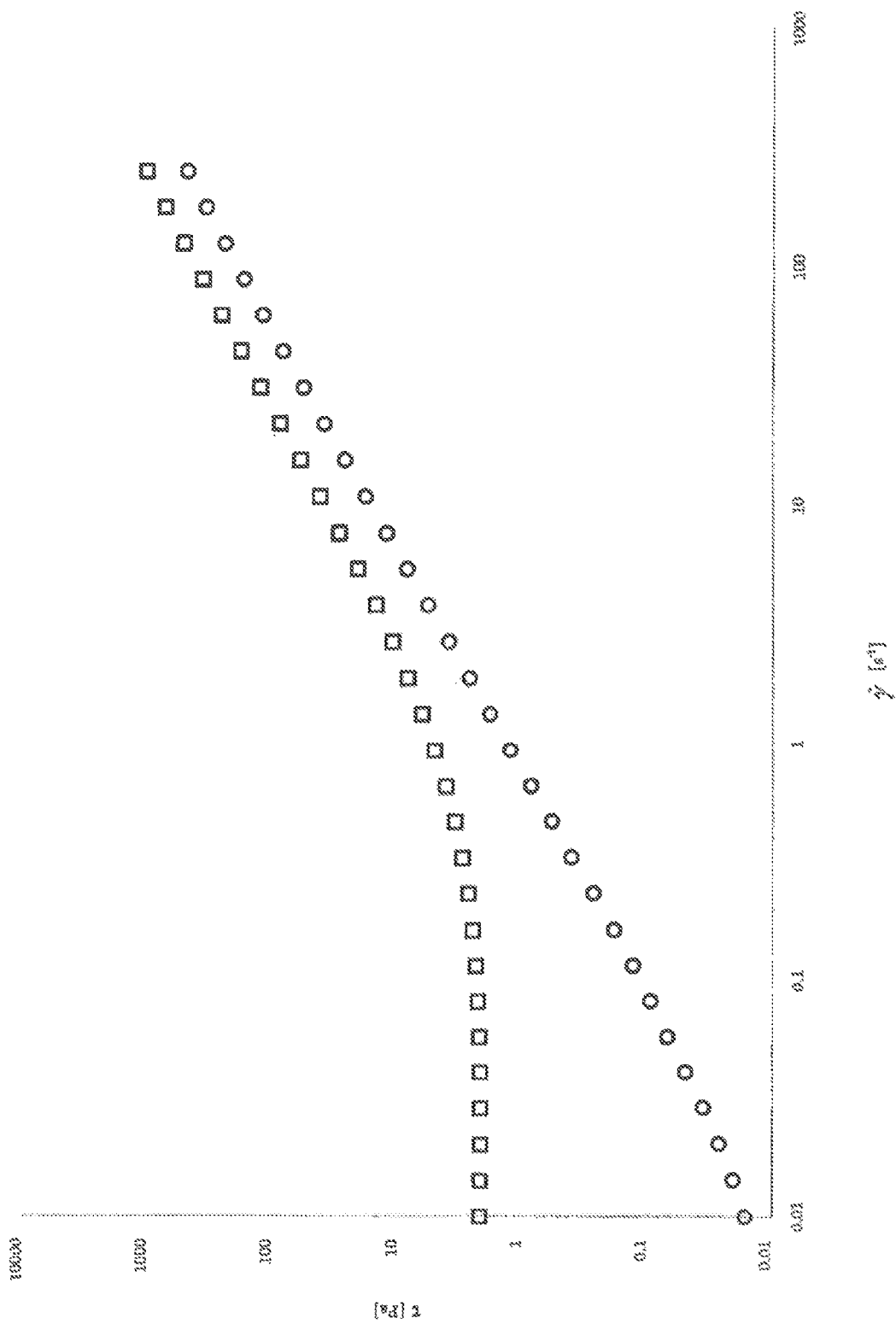
Figure 7:
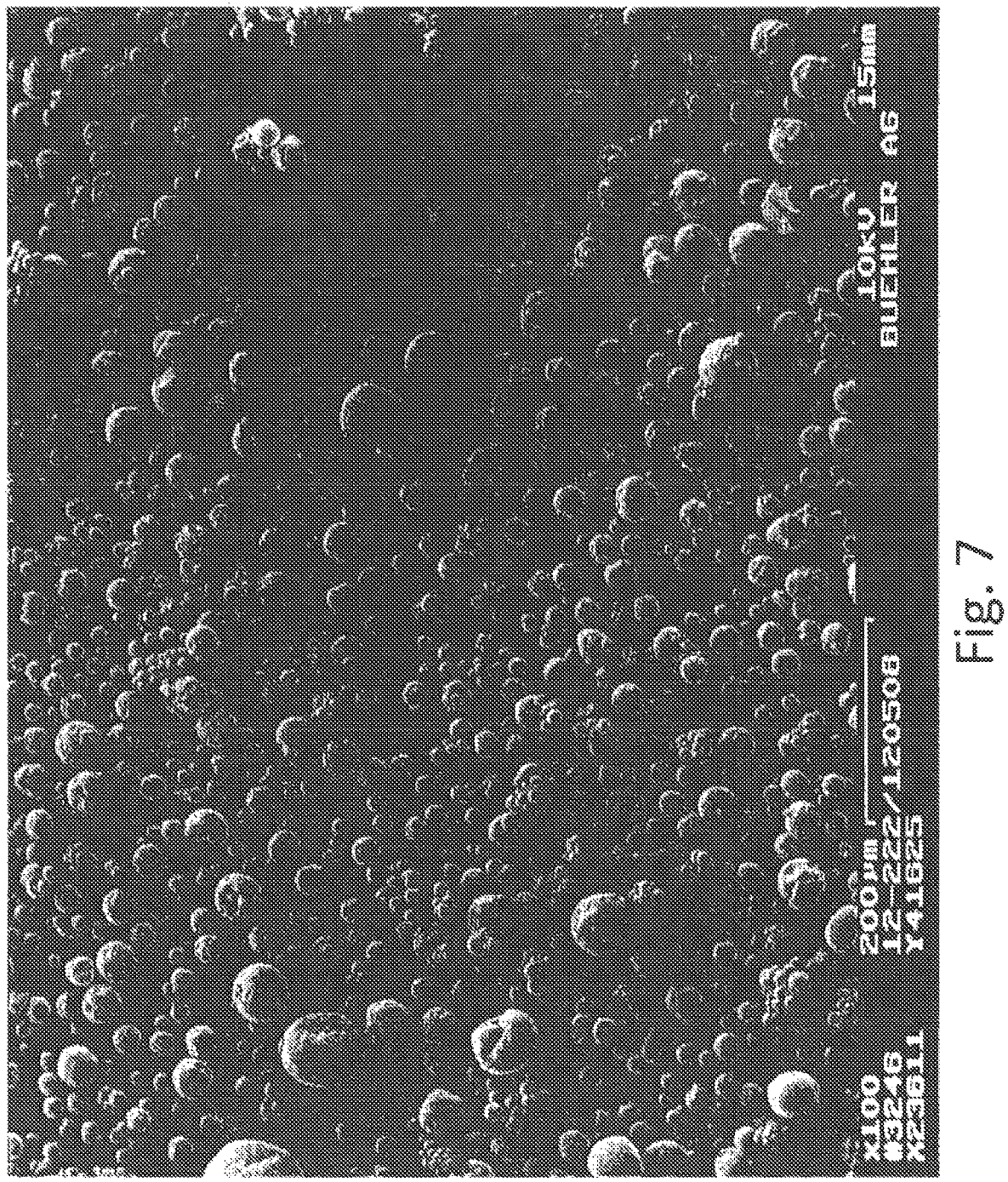
Figure 8:
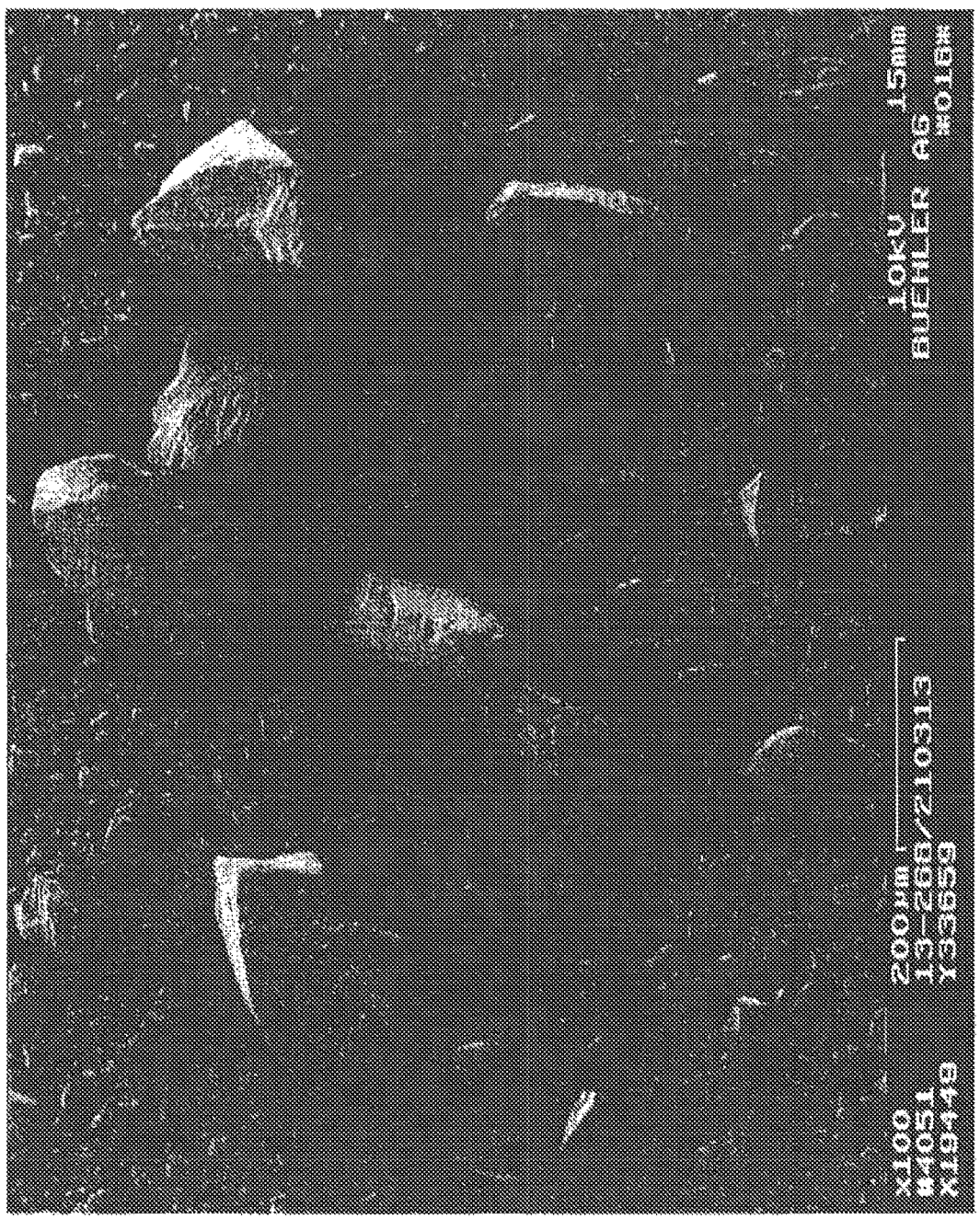

FIG. 1a a graph in which the influence of the content of dextrose DE43 in a dextrose DE43/sucrose mixture on the glass transition temperature is plotted as a function of the water content;

FIG. 1b a graph in which the influence of the degree of polymerization of the dextrose on the glass transition temperature is plotted as a function of the water content;

FIGS. 2a, 2b graphs in which the size distribution of two model systems are plotted;

FIG. 3 a graph in which the viscosities and the shear stresses of food suspensions having spherical and singular particles are plotted as a function of the shear rate;

FIG. 4 a graph in which the yield points of the food suspensions having spherical and angular particles are plotted as a function of the volume solids concentration with and without the emulsifier lecithin;

FIG. 5a, 5b graphs in which the shear stresses of the food suspensions having spherical and angular particles with and without the emulsifiers lecithin and PGPR are plotted as a function of the shear rate;

FIG. 6 a graph in which the shear stress functions of food suspensions having spherical composite particles and angular particles and having the emulsifier PGPR are shown in magnification;

FIG. 7 an SEM (scanning electron microscope) photograph of spherical particles according to the invention;

FIG. 8 an SEM (scanning electron microscope) photograph of angular particles such as are used in conventionally produced consumable masses.

DETAILED DESCRIPTION OF THE PREFERRED EMBODIMENTS

For production by way of example of spherical particles according to the invention, a component mixture A is first prepared, namely sucrose, dextrose with DE43 and/or cocoa powder with various contents are mixed. The particular contents for the various examples are to be found in Table 1.

The mixture is introduced into water, whereupon the sucrose and dextrose content, dissolves, so that a solids content of 0.4-0.65 is present, which corresponds to a weight content of 40-65%.

The mixture is heated at 75-90° C. for 10-30 minutes, while stirring.

Alternatively, the sugar can first be mixed in at temperatures of 50° C.-80° C., with intensive stirring, and dissolved with further stirring, in particular for 10-30 minutes. Further components can then be added. In an advantageous embodiment cocoa powder can be mixed in at temperatures of 20-50° C.

At the same time a component mixture B is prepared. In the present example component mixture B comprises skimmed milk powder in various contents, suck as are likewise to be found in Table 1. Alternatively, other milk constituents can also be employed, such as e.g. whey protein isolate. Instead of milk constituents present in pulverulent form, these can also be used as components present as a liquid.

About the same amount of water as contents A is added to component mixture B and the mixture is first preheated to 55-66° C. Mixtures A and B present in aqueous solutions are then combined, mixed further, subsequently spray dried and formed into spherical particles.

TABLE 1

| | Ingredients | Example 1 Content in wt. % | Example 2 Content in wt. % | Example 3 Content in wt. % |
|---|---|---|---|---|
| A | Sucrose | 46.2 | 40.6 | 60 |
| | Dextrose D43 | 30.8 | 27.1 | 10 |
| | Cocoa powder | 23.1 | 7.5 | 30 |
| B | Skimmed milk powder | 0 | 24.8 | 0 |

For the examples investigated, the values which can be seen from Table 2 result for the glass temperature and the water content.

TABLE 2

| | Example 1 | Example 2 | Example 3 |
|---|---|---|---|
| Glass transition temperature ($T_g$ in ° C.) | 70.9 | 55.6 | 52.9 |
| Water content (in wt. %) | 1.2 | 2.2 | 2.9 |

Due to the ingredients used, the spray-dried particles have a matrix material, here comprising sucrose and dextrose DE43, having a dextrose equivalent of greater than 43.

When the particles are stored at a relative humidity of less than 0.33 at 25° C., no after-crystallization takes place during 48 h. The water content, which defines the water activity via the fugacity, is established with a saturated salt solution.

The water content was determined by means of Karl Fischer titration. The apparatuses 784 KFP Tritrino and 703 Ti Stat from Metrohm AG were used here.

For the analysis, the solvent (HYDRANAL® formamide, art. no. 34724-1L and methanol, art, no. 34741-2.5L-R in the ratio 1:1) was initially introduced and heated to 50° C. The analysis was carried out at 50° C. because the sugar dissolves more easily at this temperature.

The measuring apparatus was calibrated by means of the HYDRANAL® water standard 10.0 (Sigma-Aldrich, art, no. 34849-80ML) according to instructions, HYDRANAL® Composite 5 (art, no. 34805-1L-R, Sigma Aldrich) was used as the titration solution.

For the determination of the water content, the sample to be analyzed (150-250 mg) was weighed by means of an analytical balance (Mettler Toledo AE200) and dissolved in the formamide/methanol mixture which had been preheated to 50° C. After the sample bad dissolved completely, the titration was started and finally, after conversion of the volumetric result, the gravimetric water content (water content based on the moist sample) was determined.

The glass transition temperature $T_g$ was determined in accordance with DIN 51007 by means of dynamic differential scanning calorimetry (DSC). The measurement was carried out with the apparatus DSC822e from Mettler-Toledo GmbH.

5 mg of the particular sample material were weighed in the sample container without compaction. Weighing was carried out using a Sartorius MC5 (serial number 40809390) balance. A 40 μl aluminum crucible from Mettler Toledo (article number 5119870) was used as the sample container. The crucible was closed and placed in the measuring cell.

The measurement was carried out in ambient air, 10° C. was selected as the start temperature and the sample was heated at a heating rate of 10° C. per minute up to 170° C. The sample was then cooled again to 10° C. The start temperature was kept constant for five minutes.

The evaluation was carried out by means of STARe software (SW 8.10, Mettler-Toledo GmbH). The integration limits were automatically specified here and the DIN middle point, which is defined as the point of intersection of a horizontal with the measurement curve at half the step height, was specified as the evaluation point.

The step height is defined by the vertical distance between the two points of intersection of the mean tangents with the base lines of the measurement curve before and after the glass transition. The mean tangent is determined iteratively.

The calibration was carried out with an indium sample. A base line construction was not necessary since an empty reference crucible was also measured.

FIG. 1a shows the influence of the content of dextrose DS43, that is to say of dextrose having a dextrose equivalent of 43, in a dextrose/sucrose mixture on the glass transition temperature.

The glass transition temperature $T_g$ in ° C. is plotted against the water content w (stated in percent by weight) for dextrose/sucrose mixtures having different contents of dextrose DE43, five curves being shown, representing the particular values for the content ratios 10:90, 20:80, 40:70, 50:60 and 50:50.

The glass transition temperature falls with increasing water content. Nevertheless, the higher the content of dextrose DE43, the higher the glass transition temperature.

In principle, the glass transition temperature for two-component systems is obtained from the Gordon-Taylor model in the following form:

$$T_g = (x_1 T_{g,1} + K x_2 T_{g,2})/(x_1 + K x_2)$$

wherein $$K = \Delta c_{p,w}/c_{p,1}$$

Here, is the weight fraction of component i, $T_{g,i}$ is the glass transition temperature of components i in K, K is the Gordon-Taylor constant, $\Delta c_{p,w}$ is the change in thermal capacity at the glass transition of water in J k$^{-1}$ K$^{-1}$ and $\Delta c_{p,i}$ is the change in thermal capacity at the glass transition of component i.

In the present case the measurement data were approximated by means of Gordon-Taylor curves.

The measurement of the glass transition temperature $T_g$ was carried out by means of dynamic mechanical analysis (DMA) using a DMA Q800 (TA Instruments, USA) and the associated evaluation software Universal Analysis (SW 4.5A, TA Instruments, USA).

The measurements were carried out in the penetration geometry by means of the "controlled force method". The samples (120 mg, solid samples pressed to tablets with 5 kN) were introduced into a cylindrical depression (2.5 mm depth, 6 mm diameter). The sample was temperature-conditioned in the measuring apparatus before the measurement (5 minutes, −60° C.). The movable shaft (cylindrical tip, diameter 2.8 mm) of the penetration geometry pressed on the sample with a constant static force (5 N) throughout the entire duration of the measurement. The path of the movable shaft (sinking into the sample) was recorded here. A temperature ramp with a heating rate of 2° C. per minute was run until the shaft had reached the null position. With the aid of the temperature versus position curve, the onset temperature of glass transition was determined with the evaluation software. In the present case, for this the position curve was evaluated with a distance of 0.5° C. and the gradient determined. When the gradient exceeded the value of 10 μm/° C., the onset temperature was regarded as reached.

FIG. 1b shows the influence of the degree of polymerization on the glass transition temperature. The glass transition temperature $T_g$ in ° C. is again plotted against the water content for dextrose/sucrose mixtures w (stated in percent by weight) with various dextrose contents and tor various dextroses.

Curves 1 and 2 (broken line) each show the glass transition temperature for dextrose/sucrose mixtures in which the ratio of dextrose to sucrose is 50:50, curves 3 and 4 (solid line) show the glass transition temperature for dextrose/sucrose mixtures in which the ratio of dextrose to sucrose is 10:90.

A dextrose having a dextrose equivalent of DE43 (curves 1 and 3, triangular symbols) and a dextrose having a dextrose equivalent of DE19 (curves 2 and 4, square symbols) were used respectively.

It is confirmed in principle, analogously to FIG. 1a, that the glass transition temperature falls with increasing water content and is higher at a higher content of dextrose.

The higher moreover the degree of polymerization (lower dextrose equivalent), the higher the glass transition temperature.

Two model systems are drawn up for the comparative rheological investigations.

They comprise, based on the total mass, a weight content of 50% of sugar (dextrose DF43 and sucrose in a ratio of 40:60), a weight content of 15% of cocoa (Gerkens cocoa with 10.5 wt. % of fat), a weight content of 34.5% of cocoa butter (Delphi, deodorized) in a weight content of 0.5% of soya lecithin (Lecico F600 IPM).

For the first model system the cocoa and the sugar were spray dried together. Spherical particles result.

For the preparation of the spray solution 15.5% by weight of cocoa powder, 23% by weight of sucrose, and 11.5% by weight of dextrose DE43 are dissolved in 50% by weight of water.

Due to the ingredients used, the matrix material, here comprising sucrose and dextrose DE43, has a dextrose equivalent of greater than 43.

The solution has a density of about 1,450 kg/m$^3$ and a viscosity of about 250 mPa s at a shear rate of 34.6 s$^{-1}$, such as is typically present on passing through the nozzle.

The solution is processed in a spray dryer by means of a hot air stream, the volume flow of which is from 0.102 m$^3$/s, at a fluid volume flow of 0.96 l/h. The temperature of the drying air is approx. 155-180° C. on entry into the spraying tower, approx. 115-130° C. in the middle of the spraying tower and is still about 70-85° C. on flowing out of the spray dryer (mixing with fresh air of 20° C.). The product is removed in a stable condition at temperatures below the glass transition temperature.

The nozzle used is a two-component nozzle, in particular an Exmix two-component nozzle, having an inner opening for the fluid phase which has a diameter of 4 mm, and having a concentric annular opening for the spray gas phase. The length of the nozzle is 0.05 m.

The speed of the atomizing air which flows through the annular opening at about 100° C. is about 140 m/s.

The resulting spherical particles have a residual moisture content of 2.0-4.5% by weight.

The particle size can be adjusted via the speed of the atomizing air, the viscosity of the solution, the diameter of the central nozzle opening and/or the diameter of the annular gap.

For a second model system, the cocoa and the sugar are processed on a triple roll mill in the conventional manner. The particles formed are broken crystals having a facetted surface; in the following these are called “angular particles”. FIG. 8 shows the structure of angular particles such as are formed in the process of comminution in roll mills.

FIGS. 2*a* and 2*b* show with the continuous lines in each case the size distributions of the spray-dried spherical particles.

The broken lines in each case show the size distributions of the angular particles.

FIG. 2*a* shows the number density distribution go against the particle size, while FIG. 2*b* shows the volume distribution $q_3$ against the particle size.

$q_0$ and $q_3$ values for a particular particle size $x_i$ are calculated according to $$q_0(x_i)=n_i/|(\Delta x_i \Sigma n_i)$$

$$q_3(x_i)=v_i/|(\Delta x_i \Sigma v_i)$$

wherein $n_i$ is the number of particles in the diameter interval between $x_i-\Delta x_i$ and $x_i$ and $v_i$ is the total volume of the particles in the diameter interval between $x_i-\Delta x_i$ and $x_i$.

The particle size distributions were determined using laser diffraction spectroscopy. A Beckman Coulter LS13320 apparatus was used here.

While the cocoa is embedded into spherical amorphous sugar shells in the spherical particles, the cocoa in the comparative mass is present as angular, non-enveloped particles. The smaller cocoa particles and the lack of sphericity of the angular sugar particles are responsible for a widening of the curve and the formation of a further peak in the volume size distribution of the angular particles in FIG. 2*b*.

FIGS. 2*a* and 2*b* show that the two model systems are entirely comparable with respect, to the particle size distribution.

The model systems differ in that the particles are on the one hand angular and on the other hand spherical.

The angular and spherical particles are in each case suspended in cocoa butter.

FIG. 3 shows with the aid of blank symbols the viscosity η of the cocoa butter suspensions in which on the one hand the angular particles (square symbols) and on the other hand the spherical particles (circular symbols) are suspended, as a function of the shear rate at a solids volume content of 0.55. The mass has a lecithin content of 0.5% by weight (based on the emulsifier phase and fatty phase). The measurements were carried out at a temperature of 40° C.

The same figure shows the corresponding shear stress functions τ with correspondingly solid symbols.

A lower viscosity/shear stress evidently results for the spherical particles over the entire shear rate range. At the same solids volume content a significantly more readily flowable model chocolate mass therefore results with spherical particles.

This has a serious influence on the sensorial quality of the mass and on the processability of the mass.

The shear stress functions can be approximated well according to the Windhab model and for an extrapolation in the direction of disappearing shear rates give the yield point $\tau_0$ as the limit value. This is a measure of the start of flow when the shear stress increases.

If the yield point of the mass is too high, the mass can no longer be pumped or can still be pumped only with difficulty and can no longer be processed or can be processed only with a high expenditure of energy.

FIG. 4 shows the yield points $\tau_0$ of the model systems as a function of the solids volume concentrations thereof.

The square symbols here show the yield point for the model system having angular particles, the circular symbols the yield point for the model system the spherical particles, the blank symbols the values for the particular model system without addition of lecithin and the solid symbols the values for the particular system having a content of 0.5% by weight of lecithin (amount of emulsifier based on the amount of emulsifier and fatty phase).

A significantly lower yield point results for the cocoa batter having the spherical particles over the entire range of the solids volume concentrations.

If the logarithmic presentation is dispensed with, it is found that at solids volume contents of less than 50% the viscosities of the masses having angular and spherical particles are of a comparable order of magnitude. At higher solids volume concentrations, on the other hand, the viscosity of the suspension having angular sugar particles is considerably higher. That is to say, the steric close-range interactions dominate the particle structure influence on the rheological suspension properties.

If a particular sensorial quality is required, and therefore a particular viscosity of the consumable mass, using spherical particles this can also be achieved with a higher volume content of the sugar particles. Less cocoa butter can thus be used, so that a lower-calorie product can be produced for the required sensorial quality.

Thus, for example, the viscosity of a cocoa butter having angular particles at a solids volume content of 0.53 corresponds to the viscosity of a cocoa butter having spherical particles at a solids volume content of 0.68. The same viscosity can thus be achieved by using spherical particles with 15% by volume less fatty phase, which alone corresponds approximately to a calorie reduction of 24%.

For the sensorial quality, the particle size moreover plays a role with respect to the roughness perceived. While spherical particles are perceived as indistinguishable over a wide size range, a significant perception threshold results for angular particles. For a good sensorial quality angular particles must therefore be worked for a sufficiently long time so that small particles, preferably having a diameter (volume-based, X90,3) of 90% of the volume of all the particles of less than 25 μm, are present.

The spherical particles, in contrast, can also be used as larger particles, in particular having diameters (volume-based, X90,3) of up to 90% of the volume of all the particles of less than 30-45 μm, into which further substances can be embedded, which merely has an influence on the taste, but not on other parameters of sensorial quality, such as the granularity felt or the viscosity of the mass.

FIG. 5a shows the shear stresses τ of the consumable masses having angular particles as a function of the shear rate, FIG. 5b shows the shear stresses τ of the consumable masses having spherical particles as a function of the shear rate.

The circular symbols here show the values for the particular model systems without emulsifier, the square symbols the values for the particular model systems having a lecithin content of 0.5% by weight (amount of emulsifier based on the amount of the emulsifier phase and fatty phase) and the triangular symbols the values for the particular model systems having a PGPR (polyglycerol polyricinoleate) content of 0.5% by weight (amount of emulsifier based on the amount of the emulsifier phase and fatty phase).

The solids volume content is 0.55, the temperature 40° C.

On the one hand the values already shown in FIG. 3 for the model systems described above (square symbols) which have a lecithin content of 0.5% by weight (based on the emulsifier phase and fatty phase) are included here.

On the other hand the shear stresses for corresponding systems having angular and spherical particles in which the addition of the emulsifier was dispensed with are shown (circular symbols).

If the cocoa butter having the angular particles is first considered, the known effect of the emulsifier can be seen. From a certain solids volume concentration the addition leads to reduced shear stresses, that is to say to more flowable masses. In the case of the angular particles the lecithin acts as a type of spacer which reduces interlocking of the particles.

In the case of the spherical particles the lecithin has a surprising reverse action. Without the lecithin the shear stresses are significantly reduced.

The spherical particles thus react to addition of lecithin in precisely the opposite way compared with the angular particles.

Moreover, the difference in the yield points compared with and without lecithin is significantly greater in the case of the spherical particles. The dependency of the yield points on the amount of emulsifier added is likewise more pronounced for spherical particles.

Addition of the emulsifier PGPR (polyglycerol polyricinoleate) to systems having spherical particles in contrast lowers the yield point further to disappearance thereof when the emulsifier concentration is increased to 0.5% by weight (amount of emulsifier based on the amount of the emulsifier phase and fatty phase) (triangular symbols in FIG. 5b).

FIG. 6 again shows the shear stress as a function of the shear rate for angular (square symbols) and spherical particles (circular symbols) at a solids volume content of 0.55 and with a PGPR concentration of 0.5% by weight (amount of emulsifier based on the amount of the emulsifier phase and fatty phase). It is clear that there is a considerable difference between the influence of the emulsifier PGPR on the shear stress of a food suspension having angular or spherical particles.

For a food suspension in which spherical particle are suspended in a substantially homogeneous fluid phase, in particular a fat mass, this means that surface-active substances, that is say emulsifiers, which add on to the surfaces of the spherical particles, already have a decisive influence on the particle-particle interaction at small concentrations below a solids volume content of 0.5, which is partly the converse of the effects compared with suspensions having angular particles.

A desired sensorial quality, in particular a viscosity, can be established in a targeted manner with the addition of a small amount of an emulsifier.

For emulsifiers typical for chocolate surprisingly novel dependencies on the nature of the particle shape or particle surface have been found here, which can preferably be utilized in a targeted manner in order to optimize the flow properties of corresponding suspensions to the extent that with a minimal fluid phase, in particular fat, content and associated reduction in calories and costs, viscosities which are reduced by a maximum amount are to be achieved.

If angular and spherical particles are present in the consumable mass, the particle-particle interaction and therefore flow properties, in particular the viscosity, can also be adjusted at the same time via the content of spherical particles and/or the nature and/or amount of the emulsifier.

Thus independently of the base recipe, that is to say, for example, the amount of cocoa, sugar and/or fat mass, the flow properties can be influenced in a targeted manner.

Preferably, a food product according to the invention comprising a consumable mass comprises more than 70% by weight, preferably more than 90% by weight, from (a) sugar/biopolymer (b) cocoa butter and/or (c) cocoa and/or (d) milk constituents, wherein spherical, amorphous composite particles are formed according to the invention from (a, c, d), having a volume content of cocoa butter as a fatty continuous phase of less than 50% by weight, preferably less than 30% by weight, still further preferably less than 25% by weight, and nevertheless has at 40° C. a yield point $\tau_0$ which is reduced by at least 50%, preferably 70%, further preferably 90% compared with a conventionally structured chocolate suspension of the same composition.

The yield point and viscosity function are determined in accordance with OICCC (Office International du Cacao, du Chocolat et de la Confiserie) Standard Method 46 (2000) (e.g. described in A. Hess, Süsswaren 9/2001 or via: http://caobisco.eu/caobisco-choco-late-biscuits-confectionery-europe-page-44-Analytical-methods-.html) and approximated according to Windhab (J.-C. Eischen and E. J. Windhab; Applied Rheology 1/2, 2002, pp. 32-34).

In the measurement, however, instead of the concentric cylinder geometry CC27 (Anton Paar GmbH, Germany) a vane geometry (ST22-4V-40, Anton Paar GmbH, Germany) with a sample volume of 40 ml is used. For the measurement, the measurement geometry is immersed completely in the sample (surface 10 mm below the sample limit). The measuring cylinder, of CC27 (measuring cell TEZ 150P-C) geometry was used as the sample vessel.

An extended shear ramp was moreover run for the measurement: The sample (300 ml) was premixed beforehand in a mixing kneader (Ikavisc measuring kneader MKD 0.6-

H60) for 20 min at 50 rpm and 40° C. and 40 ml was then filled into the measurement geometry, described above, of the rheometer (PHYSICA MCR 300, Modular Compact Rheometer, Anton Paar GmbH, Germany) and measured. An upwards ramp of 0.01 s$^{-1}$ up to 250 s$^{-1}$ was recorded here for 10 minutes at 40° C. (30 measurement points, logarithmic distribution). Subsequently to the upwards ramp, a downwards ramp was recorded likewise at 40° C. in the reverse direction (30 measurement points, 10 min).

For the determination of the yield point, finally, with the evaluation software RheoPlus (Rheoplus/32 Multi3 V3.61) the downwards ramps was evaluated over the complete measurement range using the model IOCCC 2000 Windhab.

FIG. 7 shows an SEM (scanning electron microscope) photograph of spherical particles according to the invention according to Example 1 as shown above.

FIG. 8 shows the structure of angular particles such as may form, for example, in the process of comminution in roll mills. Since all the particles are passed through several pairs of rollers at a narrowing separation, all the particles which are larger than the smallest roller separation are necessarily broken. Angular, non-spherical particles must therefore be formed.

In addition to this process, comminution in impact or jet mills (dry grinding) and stirred ball mills is also employed.

In all the comminution processes which are conventionally employed (e.g. roller grinding, dry grinding in impact or shearing mills, stirred ball mills and ball mills) a reduction of the particle size starting from large solid particles, such as e.g. sugar crystals of 1-2 mm, to small particles in the region of 100 micrometers and below is carried out. Fragments which in the majority are not spherical, round shapes are necessarily formed in these processes. In particular in the size range between 5 µm and 100 µm this can be readily observed under a light microscope.

The invention claimed is:

1. A spherical particle for producing a food product, wherein the particle comprises a matrix material of an amorphously solidified biopolymer,
   the matrix material has an equilibrium water content of less than 10% by weight, and
   at least one of the following constituents is embedded into the matrix material:
      a cocoa constituent,
      a milk constituent, and
      a fat,
   wherein the spherical particle is made by a process comprising the steps of:
      providing an aqueous biopolymer fluid phase by dissolving a biopolymer in an aqueous fluid phase;
      adding at least one of the following constituents:
         the cocoa constituent,
         the milk constituent, and
         the fat,
         to form a dispersion;
      carrying out a shaping and separating process on the dispersion by spray drying; and
      solidifying into spherical particles.

2. The spherical particle as claimed in claim 1, wherein the particle comprises the matrix material to an extent of at least 5% by volume and/or to an extent of at least 50% by weight.

3. The spherical particle as claimed in claim 1, wherein the particle has a diameter of less than 500 µm.

4. The spherical particle as claimed in claim 1, wherein the biopolymer has a water activity of less than 0.7.

5. The spherical particle as claimed in claim 1, wherein the matrix material has a density of between 0.1 and 2.5 g/cm$^3$.

6. An agglomerate of spherical particles as claimed in claim 1.

7. The spherical particle as claimed in claim 1, wherein the particle comprises a matrix material of an amorphously solidified sugar.

8. A method of producing spherical particles as claimed in claim 1, comprising the following:
   (i) providing an aqueous biopolymer fluid phase;
   (ii) carrying out a shaping and separating process; and
   (iii) solidifying to spherical particles.

9. The method as claimed in claim 8, further comprising dissolving sugar constituents in an aqueous fluid phase.

10. The method as claimed in claim 8, further comprising adding solid particles and/or volumes of liquid and/or volumes of gas to the biopolymer fluid phase.

11. The method as claimed in claim 8, further comprising carrying out a spray drying on the aqueous phase or on a dispersion.

12. The method as claimed in claim 8, further comprising solidifying to spherical particles having an equilibrium water content of less than 10% by weight.

13. A food suspension, wherein the food suspension comprises a substantially homogeneous carrier material into which spherical particles and/or agglomerates of spherical particles are embedded,
   wherein the spherical particles comprise a matrix material of an amorphously solidified biopolymer.

14. The food suspension as claimed in claim 13, wherein the biopolymer has an equilibrium water content of less than 10% by weight.

15. The food suspension as claimed in claim 13, wherein at least 90% of a volume of all the spherical particles have a size smaller than 500 µm.

16. The food suspension as claimed in claim 13, wherein the carrier material comprises a fat mass which comprises triglycerides which are at least partially crystallized at 20° C.

17. A method for producing the food suspension as claimed in claim 13, comprising:
   (i) providing spherical particles and/or agglomerates of spherical particles; and
   (ii) suspending or mixing the spherical particles in a carrier material.

18. A food product comprising the food suspension as claimed in claim 13.

19. The food suspension as claimed in claim 13, wherein the spherical particles comprise a matrix material of a sugar.

20. The food suspension according to claim 13, wherein the equilibrium water content of the matrix material is less than 10% by weight,
   a cocoa constituent is embedded in the matrix material,
   the carrier material is a fat-continuous fluid which comprises a fat material, and
   at least 90% of a volume of all of the spherical particles have a size below 50 µm.

21. The food suspension according to claim 13, wherein a milk constituent namely a milk dried mass from partially or completely dehydrated whole milk, partially or fully skimmed milk, lactose-free or lactose-reduced milk, cream, partially or completely dehydrated cream, lactose-free or lactose-reduced cream, butter or milk fat, is embedded into the matrix material, and
   the particle comprises the matrix material to an extent of at least 50% by volume and/or to an extent of at least 50% by weight.

22. The food suspension according to claim 13, wherein the matrix material has an equilibrium water content of less than 10% by weight, and
at least one of the following constituents is embedded into the matrix material of one of:
a cocoa constituent,
a milk constituent, and
a fat,
wherein the spherical particles are made by a process comprising the steps of:
providing an aqueous biopolymer fluid phase by dissolving a biopolymer in an aqueous fluid phase;
adding at least one of the following constituents:
the cocoa constituent,
the milk constituent, and
the fat,
to form a dispersion;
carrying out a shaping and separating process on the dispersion by spray drying; and
solidifying into spherical particles;
or
solid particles and/or volumes of liquid and/or volumes of gas are embedded into the matrix material, and the spherical particles are made by a process comprising the steps of:
providing an aqueous biopolymer fluid phase by dissolving a biopolymer in an aqueous fluid phase;
adding at least one of the following constituents:
solid particles,
volumes of liquid, and
volumes of gas, to form a dispersion;
carrying out a shaping and separating process on the dispersion by spray drying; and
solidifying into spherical particles.

23. A consumable mass comprising an agglomerate of particles, wherein at least some of the particles are spherical particles having a matrix material of an amorphously solidified biopolymer and/or agglomerates of spherical particles.

24. The consumable mass as claimed in claim 23, wherein a further portion of the particles are fat particles.

25. The consumable mass as claimed in claim 23, wherein at least some of the particles are spherical particles which have a matrix material of a sugar.

26. The consumable mass according to claim 23, wherein the spherical particles comprise a matrix material of an amorphously solidified biopolymer,
the matrix material has an equilibrium water content of less than 10% by weight,
at least one of the following constituents is embedded into the matrix material of one of:
a cocoa constituent,
a milk constituent, and
a fat,
or
solid particles and/or volumes of liquid and/or volumes of gas are embedded into the matrix material.

27. A method for producing the consumable mass as claimed in claim 23, comprising the following:
(i) providing spherical particles having a matrix material of an amorphously solidified biopolymer and/or agglomerates of spherical particles;
(ii) providing further particles; and
(iii) agglomerating the spherical particles and the further particles.

28. The method as claimed in claim 27, wherein further particles are fat particles which are produced by a shaping and separation process.

29. The method as claimed in claim 27, further comprising agglomerating the spherical particles and the further particles under pressure and/or the action of temperature and/or with the addition of aqueous liquid and/or of oil and/or of emulsion.

30. A food product comprising the consumable mass as claimed in claim 23.

31. A food suspension which has solid particles suspended in a fatty phase, and which comprises to an extent of more than 90% constituents selected from the group consisting of cocoa butter, sugar and cocoa,
wherein the consumable mass comprises less than 50% by volume of cocoa butter and the yield point ($T_0$) at 40° C. is less than 10 Pa.

32. The food suspension as claimed in claim 31, wherein the fatty phase comprises less than 0.5% of emulsifier.

33. A spherical particle for producing a food product,
wherein the particle comprises a matrix material of an amorphously solidified biopolymer,
the matrix material has an equilibrium water content of less than 10% by weight, and
solid particles and/or volumes of liquid and/or volumes of gas are embedded into the matrix material.

* * * * *